(12) United States Patent
Zinser, Jr. et al.

(10) Patent No.: US 7,430,507 B2
(45) Date of Patent: Sep. 30, 2008

(54) FREQUENCY DOMAIN FORMAT ENHANCEMENT

(75) Inventors: Richard L. Zinser, Jr., Niskayuna, NY (US); Steven R. Koch, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 43 days.

(21) Appl. No.: 11/513,804

(22) Filed: Aug. 31, 2006

(65) Prior Publication Data
US 2007/0094017 A1    Apr. 26, 2007

Related U.S. Application Data

(63) Continuation of application No. 11/051,664, filed on Feb. 4, 2005, which is a continuation of application No. 09/822,503, filed on Apr. 2, 2001, now abandoned.

(51) Int. Cl.
G10L 21/00 (2006.01)

(52) U.S. Cl. .................. 704/219; 704/220

(58) Field of Classification Search ........ 704/219, 704/220
See application file for complete search history.

(56) References Cited

U.S. PATENT DOCUMENTS

| | | | |
|---|---|---|---|
| 4,696,040 A | 9/1987 | Doddington et al. | |
| 5,173,941 A | 12/1992 | Yip et al. | |
| 5,325,362 A | 6/1994 | Aziz | |
| 5,657,442 A * | 8/1997 | Groves | 714/28 |
| 5,680,508 A | 10/1997 | Liu | |
| 5,806,027 A | 9/1998 | George et al. | |
| 5,822,732 A | 10/1998 | Tasaki | |
| 5,825,240 A | 10/1998 | Geis et al. | |
| 5,826,023 A | 10/1998 | Hall et al. | |
| 5,845,251 A | 12/1998 | Case | |
| 5,918,022 A | 6/1999 | Batz et al. | |
| 5,966,689 A | 10/1999 | McCree | |
| 5,987,327 A | 11/1999 | Lev et al. | |
| 5,995,923 A | 11/1999 | Mermelstein et al. | |

(Continued)

FOREIGN PATENT DOCUMENTS

WO    WO-00/48170 A1    8/2000

(Continued)

OTHER PUBLICATIONS

Zinser, Jr et al: "Time Domain voicing cutoff (TDVC): a high quality, low complexity 1.3-2.0 kb/sec vocoder" Speech Coding for Telecommunications.

(Continued)

*Primary Examiner*—Daniel D Abebe
(74) *Attorney, Agent, or Firm*—Howard IP Law Group, PC

(57) ABSTRACT

A method for enhancing speech prediction coefficient signals, including: a) receiving a set of prediction coefficient signals; b) calculating a set of amplitude spectrum coefficient signals based on the prediction coefficient signals; c) calculating a set of enhancement coefficient signals based on the amplitude spectrum coefficient signals; d) calculating a set of enhanced autocorrelation coefficient signals based on the enhancement coefficient signals; e) converting at least some of the enhanced autocorrelation coefficient signals into reflection coefficient signals; f) testing the range of values of the reflection coefficient signals; and g) converting at least some of the tested reflection coefficient signals into prediction coefficient signals.

6 Claims, 12 Drawing Sheets

MELP to LPC-10 Transcoder

U.S. PATENT DOCUMENTS

| | | | |
|---|---|---|---|
| 6,003,004 | A | 12/1999 | Hershkovits et al. |
| 6,044,070 | A | 3/2000 | Valentine et al. |
| 6,049,543 | A | 4/2000 | Sauer et al. |
| 6,067,511 | A | 5/2000 | Grabb et al. |
| 6,073,093 | A | 6/2000 | Zinser, Jr. et al. |
| 6,078,880 | A | 6/2000 | Zinser, Jr. et al. |
| 6,081,777 | A | 6/2000 | Grabb |
| 6,094,629 | A | 7/2000 | Grabb et al. |
| 6,097,726 | A | 8/2000 | Puntambekar et al. |
| 6,098,036 | A | 8/2000 | Zinser, Jr. et al. |
| 6,104,716 | A | 8/2000 | Crichton et al. |
| 6,119,082 | A | 9/2000 | Zinser, Jr. et al. |
| 6,122,608 | A | 9/2000 | McCree |
| 6,134,242 | A | 10/2000 | Aftelak |
| 6,138,022 | A | 10/2000 | Strawczynski et al. |
| 6,138,092 | A | 10/2000 | Zinser, Jr. et al. |
| 6,172,974 | B1 | 1/2001 | Tseng et al. |
| 6,192,335 | B1 | 2/2001 | Ekudden et al. |
| 6,208,958 | B1 | 3/2001 | Cho et al. |
| 6,253,171 | B1 | 6/2001 | Yeldener |
| 6,260,009 | B1 | 7/2001 | Dejaco |
| 6,377,915 | B1 * | 4/2002 | Sasaki ............ 704/206 |
| 6,385,195 | B2 | 5/2002 | Sicher et al. |
| 6,453,287 | B1 | 9/2002 | Unno et al. |
| 6,493,666 | B2 | 12/2002 | Wiese, Jr. |
| 6,510,407 | B1 | 1/2003 | Wang |
| 6,678,651 | B2 | 1/2004 | Gao |
| 7,016,831 | B2 | 3/2006 | Suzuki et al. |
| 7,099,823 | B2 | 8/2006 | Takamizawa |
| 2003/0028386 | A1 | 2/2003 | Zinser, Jr. et al. |
| 2003/0050775 | A1 | 3/2003 | Zinser, Jr. et al. |
| 2003/0105628 | A1 | 6/2003 | Zinser, Jr. et al. |
| 2003/0115046 | A1 | 6/2003 | Zinser, Jr. et al. |
| 2003/0125935 | A1 | 7/2003 | Zinser, Jr. et al. |
| 2003/0125939 | A1 | 7/2003 | Zinser, Jr. et al. |
| 2003/0135366 | A1 | 7/2003 | Zinser, Jr. et al. |
| 2003/0135368 | A1 | 7/2003 | Zinser, Jr. et al. |
| 2003/0135370 | A1 | 7/2003 | Zinser, Jr. et al. |
| 2003/0135372 | A1 | 7/2003 | Zinser, Jr. et al. |
| 2003/0144835 | A1 | 7/2003 | Zinser, Jr. et al. |

FOREIGN PATENT DOCUMENTS

| | | | |
|---|---|---|---|
| WO | WO-01/22403 A1 | 3/2001 | |

OTHER PUBLICATIONS

Proceeding, 1997, 1997 IEEE Workshop on Pocono Manor, PA, USA 7-10 Sep. 1997, New York, NY, USA, Sep. 7, 1997, pp. 25-26.

Zinser, Jr et al: "2.4 kb/sec compressed domain teleconference bridge with univeral transcoder" 2001 IEEE International Conference on Acoustics, Speech, and Signal Processing Proceedings (Cat. No. 01CH37221), 2001 IEEE International Conference on Acoustics, Speech, and Signal Processing, Proceedings, Salt Lake City, UT, USA, 7-11.

Kang et al, "Improving Transcoding Capability of Speech Coders in Clean and Frame Erasured Channel Environments," in Proc. Speech Coding, IEEE Workshop on Sep. 2000, pp. 78-80.

Kang et al, "Transcoding Between Two DoD Narrowband Voice Encoding Algorithms (LPC-10 and MELP)," Naval Research Lab Washington DC, Oct. 1999, pp. 1-27.

Campbell et al. "Voiced/Unvoiced Classification of Speech with Applications to the U.S. Government LPC-10E Algorithm," Proc. of the IEEE International Conference on Acoustics, Speech, and Signal Processing, 1986, pp. 473-476.

Fulghum et al. "LPC voice digitizer with background noise suppression," Acoustics, Speech, and Signal Processing, IEEE International Conference on ICASSP '79., vol. 4, Apr. 1979, pp. 220-223.

* cited by examiner

LPC to MELP Transcoder

MELP to TDVC Transcoder

TDVC to LPC-10 Transcoder

TDVC to MELP Transcoder

Dual Synthesizer State Diagram

FREQUENCY DOMAIN FORMAT ENHANCEMENT

This application is a continuation application of U.S. patent application Ser. No. 11/051,664, filed Feb. 4, 2005, which is a continuation application of U.S. patent application Ser. No. 09/822,503, filed Apr. 2, 2001 (abandoned).

FIELD OF THE INVENTION

The present invention relates to speech coders and speech coding methods. More specifically, the present invention relates to a system and method for transcoding a bit stream encoded by a first speech coding format into a bit stream encoded by a second speech coding format.

BACKGROUND OF THE INVENTION

The term speech coding refers to the process of compressing and decompressing human speech. Likewise, a speech coder is an apparatus for compressing (also referred to herein as coding) and decompressing (also referred to herein as decoding) human speech. Storage and transmission of human speech by digital techniques has become widespread. Generally, digital storage and transmission of speech signals is accomplished by generating a digital representation of the speech signal and then storing the representation in memory, or transmitting the representation to a receiving device for synthesis of the original speech.

Digital compression techniques are commonly employed to yield compact digital representations of the original signals. Information represented in compressed digital form is more efficiently transmitted and stored and is easier to process. Consequently, modern communication technologies such as mobile satellite telephony, digital cellular telephony, land-mobile telephony, Internet telephony, speech mailboxes, and landline telephony make extensive use of digital speech compression techniques to transmit speech information under circumstances of limited bandwidth.

A variety of speech coding techniques exist for compressing and decompressing speech signals for efficient digital storage and transmission. It is the aim of each of these techniques to provide maximum economy in storage and transmission while preserving as much of the perceptual quality of the speech as is desirable for a given application.

Compression is typically accomplished by extracting parameters of successive sample sets, also referred to herein as "frames", of the original speech waveform and representing the extracted parameters as a digital signal. The digital signal may then be transmitted, stored or otherwise provided to a device capable of utilizing it. Decompression is typically accomplished by decoding the transmitted or stored digital signal. In decoding the signal, the encoded versions of extracted parameters for each frame are utilized to reconstruct an approximation of the original speech waveform that preserves as much of the perceptual quality of the original speech as possible.

Coders which perform compression and decompression functions by extracting parameters of the original speech are generally referred to as parametric coders or vocoders. Instead of transmitting efficiently encoded samples of the original speech waveform itself, parametric coders map speech signals onto a mathematical model of the human vocal tract. The excitation of the vocal tract may be modeled as either a periodic pulse train (for voiced speech), or a white random number sequence (for unvoiced speech). The term "voiced" speech refers to speech sounds generally produced by vibration or oscillation of the human vocal cords. The term "unvoiced" speech refers to speech sounds generated by forming a constriction at some point in the vocal tract, typically near the end of the vocal tract at the mouth, and forcing air through the constriction at a sufficient velocity to produce turbulence. Speech coders which employ parametric algorithms to map and model There are several types of vocoders on the market and in common usage, each having its own set of algorithms associated with the vocoder standard. Three of these vocoder standards are:

1. LPC-10 (Linear Prediction Coding): a Federal Standard, having a transmission rate of 2400 bits/sec. LPC-10 is described, e.g., in T. Tremain, "The Government Standard Linear Prediction Coding Algorithm: LPC-10," *Speech Technology Magazine*, pp. 40-49, April 1982).
2. MELP (Mixed Excitation Linear Prediction): another Federal Standard, also having a transmission rate of 2400 bits/sec. A description of MELP can be found in A. McCree, K. Truong, E. George, T. Barnwell, and V. Viswanathan, "A 2.4 kb/sec MELP Coder Candidate for the new U.S. Federal Standard," Proc. IEEE Conference on Acoustics, Speech and Signal Processing, pp. 200-203, 1996.
3. TDVC (Time Domain Voicing Cutoff): A high quality, ultra low rate speech coding algorithm developed by General Electric and Lockheed Martin having a transmission rate of 1750 bits/sec. TDVC is described in the following U.S. Pat. Nos. 6,138,092; 6,119,082; 6,098,036; 6,094,629; 6,081,777; 6,081,776; 6,078,880; 6,073,093; 6,067,511. TDVC is also described in R. Zinser, M. Grabb, S. Koch and G. Brooksby, "Time Domain Voicing Cutoff (TDVC): A High Quality, Low Complexity 1.3-2.0 kb/sec Vocoder," Proc. IEEE Workshop on Speech Coding for Telecommunications, pp. 25-26, 1997.

When different units of a communication system use different vocoder algorithms, transcoders are needed (both ways, A-to-B and B-to-A) to communicate between and amongst the units. For example, a communication unit employing LPC-10 speech coding can not communicate with a communication unit employing TDVC speech coding unless there is an LPC-to-TDVC transcoder to translate between the two speech coding standards. Many commercial and military communication systems in use today must support multiple coding standards. In many cases, the vocoders are incompatible with each other.

Two conventional solutions that have been implemented to interconnect communication units employing different speech coding algorithms consist of the following:

1) Make all new terminals support all existing algorithms. This "lowest common denominator" approach means that newer terminals cannot take advantage of improved voice quality offered by the advanced features of the newer speech coding algorithms such as TDVC and MELP when communicating with older equipment which uses an older speech coding algorithm such as LPC.
2) Completely decode the incoming bits to analog or digital speech samples from the first speech coding standard, and then reencode the analog speech samples using the second speech coding standard. This process is known a tandem connection. The problem with a tandem connection is that it requires significant computing resources and usually results in a significant loss of both subjective and objective speech quality. A tandem connection is illustrated in FIG. 1. Vocoder decoder 102 and D/A 104 decodes an incoming bit stream representing parametric data of a first speech coding algorithm into an analog speech sample. A/D 106 and vocoder encoder 108 reencodes the analog speech sample into parametric data encoded by a second speech coding algorithm.

What is needed is a system and method for transcoding compressed speech from a first coding standard to a second coding standard which 1) retains a high degree of speech quality in the transcoding process, 2) takes advantage of the improved voice quality features provided by newer coding standards, and 3) minimizes the use of computing resources. The minimization of computing resources is especially important for space-based transcoders (such as for use in satellite applications) in order to keep power consumption as low as possible.

SUMMARY OF THE INVENTION

The system and method of the present invention comprises a compressed domain universal transcoder architecture that greatly improves the transcoding process. The compressed domain transcoder directly converts the speech coder parametric information in the compressed domain without converting the parametric information to a speech waveform representation during the conversion. The parametric model parameters are decoded, transformed, and then re-encoded in the new format. The process requires significantly less computing resources than a tandem connection. In some cases, the CPU time and memory savings can exceed an order of magnitude.

The method more generally comprises transcoding a bit stream representing frames of data encoded according to a first compression standard to a bit stream representing frames of data according to a second compression standard. The bit stream is decoded into a first set of parameters compatible with a first compression standard. Next, the first set of parameters are transformed into a second set of parameters compatible with a second compression standard without converting the first set of parameters to an analog or digital waveform representation. Lastly, the second set of parameters are encoded into a bit stream compatible with the second compression standard.

DETAILED DESCRIPTION OF THE INVENTION

1. Compressed Domain Universal Transcoder

Figure 1:
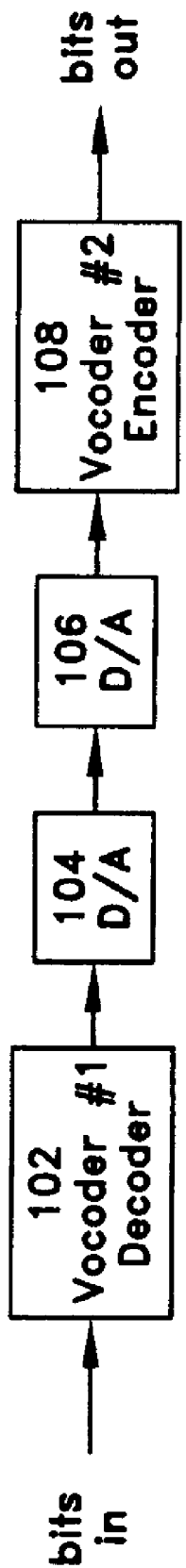
FIG. 1 depicts a block diagram illustrating a conventional tandem connection.

The transcoding technology of the present invention greatly improves the transcoding process. The transcoder directly converts the speech coder parametric information in the compressed domain without converting the parametric information to an analog speech signal during the conversion. The parametric model parameters are decoded, transformed, and then re-encoded in the new format. The process requires significantly less computing resources than the tandem connection illustrated in FIG. 1. In some cases, the CPU time and memory savings can exceed an order of magnitude.

In general terms, the transcoder of the present invention performs the following steps: 1) decode the incoming bit stream into the vocoder parameters, 2) transform the vocoder parameters into a new set of parameters for the target output vocoder, and 3) encode the transformed parameters into a bit stream compatible with the target output coder.

Figure 2:
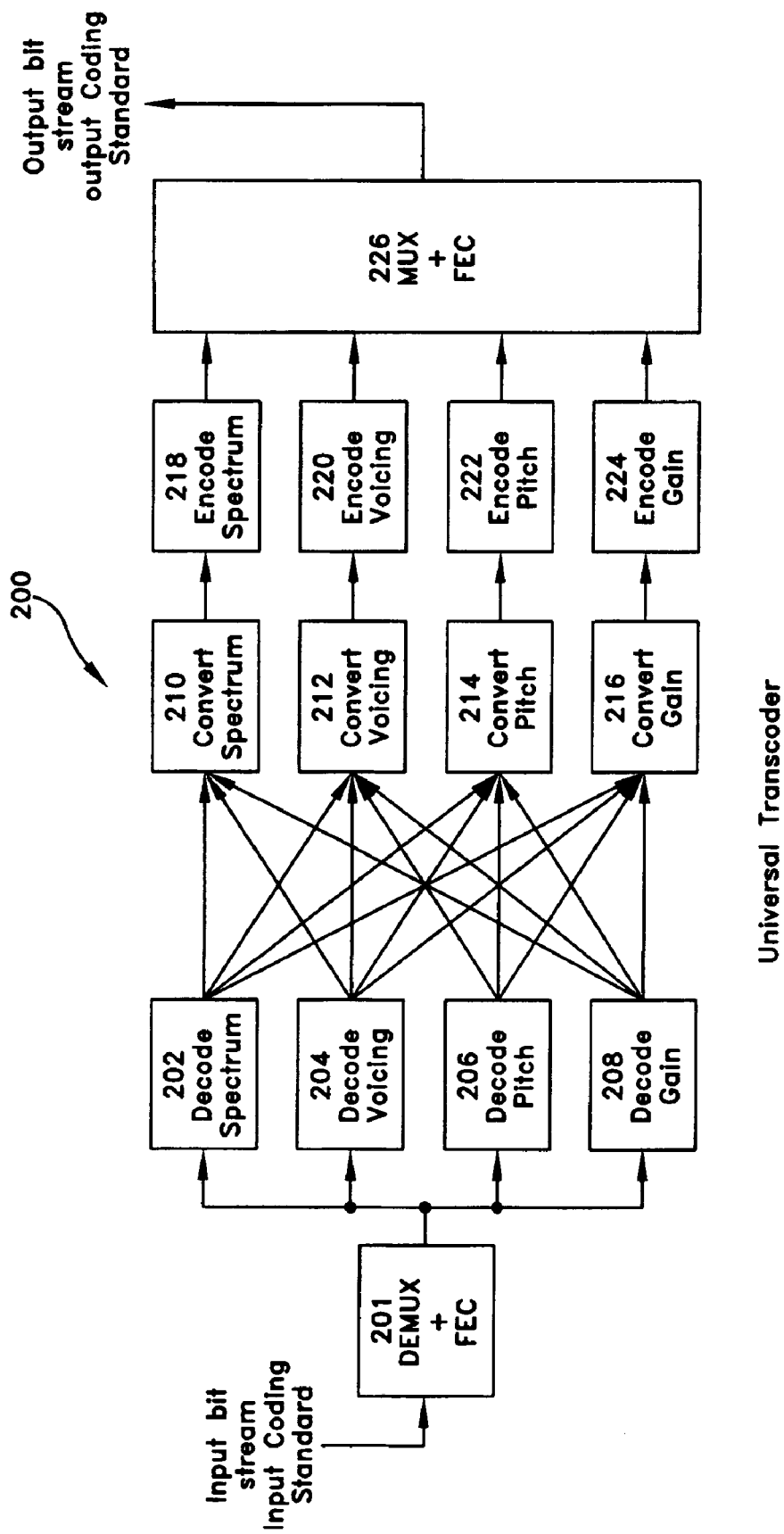
FIG. 2 depicts a block diagram illustrating the general architecture of the compressed domain universal transcoder of the present invention.

FIG. 2 is a block diagram illustrating the general transcoding process 200 of the present invention. The process 200 shown in FIG. 2 is the general conversion process that is used to convert an incoming bit stream encoded with a first coding standard to an output bit stream encoded with a second coding standard. For example, an incoming bit stream encoded with the LPC coding standard could be converted to the MELP coding standard, or an incoming bit stream encoded in MELP coding standard could be converted to the TDVC coding standard. The process shown in FIG. 2 illustrates the general process of the present invention that applies to all of the possible conversions (e.g. LPC to MELP, LPC to TDVC, MELP to LPC, etc). Each of the six individual transcoder conversions between LPC, MELP, and TDVC will later be described individually in more detail below with respect to sections 2-7 below and FIGS. 3-8.

As shown in FIG. 2, an incoming bit stream is received by demultiplexing and FEC (forward error correction decoding) step 201. The incoming bit stream represents frames containing parameters of a first coding standard such as LPC-10, MELP, or TDVC. This first coding standard will also be referred to as the "input coding standard." In step 201, forward error correction decoding is performed on the incoming data frames, and the copies of each frame are distributed to steps 202, 204, 206, and 208, respectively. FEC adds redundant bits to a block of information to protect from errors.

There are four basic types of parameters used in low rate vocoders: 1) gross spectrum, 2) pitch, 3) RMS power (or gain), and 4) voicing. Within these four categories of parameter types, each coding standard employs different numbers and kinds of parameters. For example, LPC-10 employs one voicing parameter comprised of only a single voicing bit per half-frame of data, whereas MELP employs a total of seven voicing parameters per frame (five voicing parameters representing bandpass voicing strengths, one overall voiced/unvoiced flag, and one voicing parameter called the "jitter flag") in an effort to enhance speech quality.

In steps 202, the spectral parameters of the first coding standard are decoded from the incoming data frames. In step 204, the voicing parameters of the first coding standard are decoded from the incoming data frames. In step 206, the pitch parameters of the first coding standard are decoded from the incoming data frames. In step 208, the gain parameters of the first coding standard are decoded from the incoming data frames.

In step 210, 212, 214, and 216, the decoded parameters of the input coding standard are converted to spectrum, voicing, pitch and gain parameters, respectively, of the output coding standard. Each type of conversion is described in detail in the sections below for each specific type of transcoder conversion. Note that the conversion from input coding standard parameters to output coding standard parameters is not always a simple one to one conversion of parameters. For example, the output voicing parameters could be a function of both the input voicing parameters and the input spectrum parameters (this is true, for example, for the MELP to LPC transcoding conversion, described below). Other operations are also used in the conversion process to improve the output sound quality such as interpolation operations, smoothing operations, and formant enhancement described further in sections 2-7 below.

The parameters produced by the conversion steps 210, 212, 214, and 216 will be either floating point numbers or fixed point numbers, depending on the particular output coding standard. For example, the MELP and TDVC standards use floating point numbers, whereas the LPC-10 standard uses fixed point numbers.

Encoding steps 218, 220, 222, and 224 encode and quantize the output spectrum, voicing, pitch and gain parameters, respectively, using the standard quantization/encoding algorithms of the output coding standard. Lastly, in step 226, the output parameters are combined into frames, forward error correction encoding is performed, and the output bit stream representing frames of the output coding standard are transmitted.

Each of the following individual transcoding processes will now be described in detail.

1. LPC to MELP Transcoder
2. LPC to TDVC Transcoder
3. MELP to LPC Transcoder
4. MELP to TDVC Transcoder
5. TDVC to LPC Transcoder
6. TDVC to MELP Transcoder The general transcoding method illustrated in FIG. 2 and the conversion techniques described below can also be applied to create trancoders for conversion between other coding standards besides LPC, MELP, and TDVC that are currently in usage or being developed.

2. LPC-to-MELP Transcoder

Figure 3:
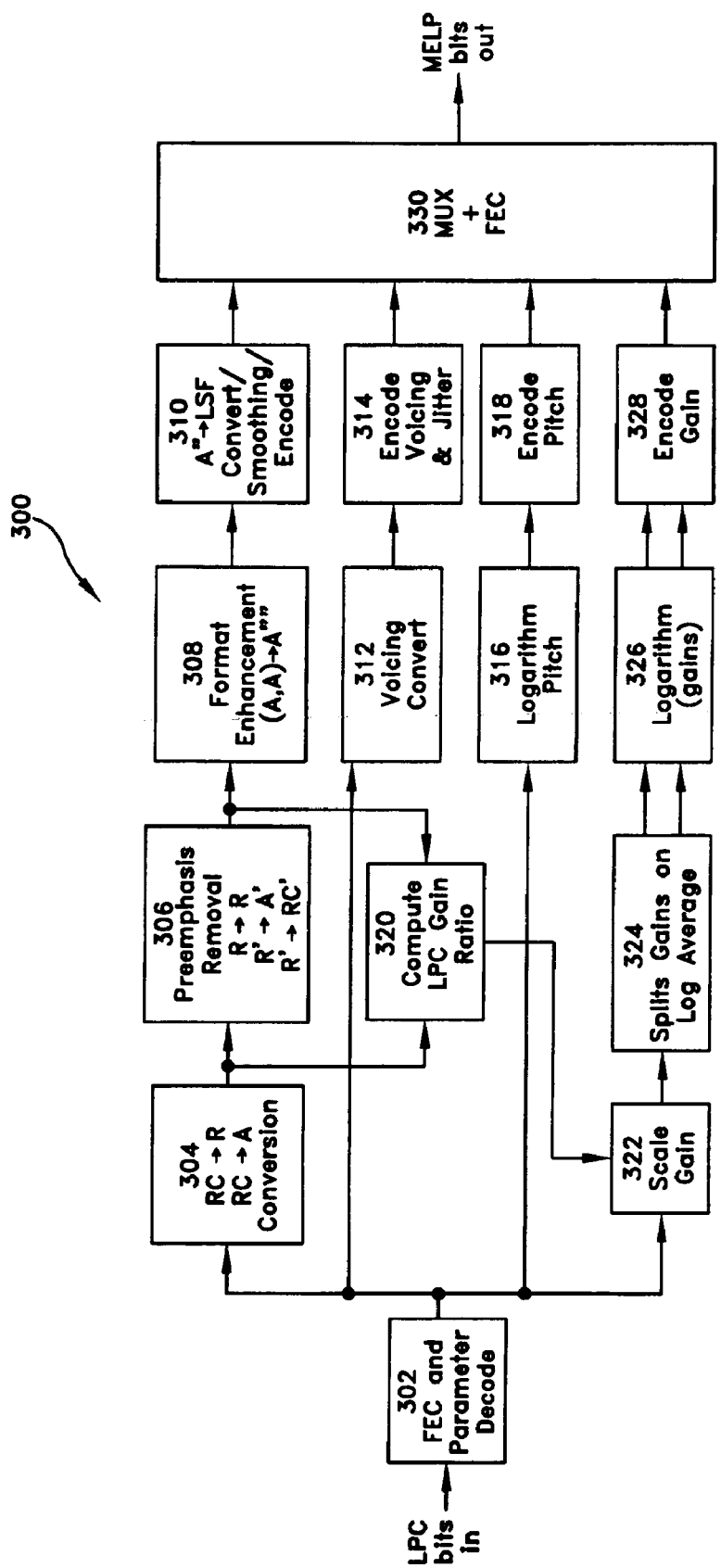
FIG. 3 depicts a block diagram illustrating an LPC-to-MELP transcoding process.

FIG. 3 illustrates a transcoding method 300 for converting a bit stream representing frames encoded with the LPC-10 coding standard to a bit stream representing frames encoded with the MELP coding standard. In step 302, an incoming bit stream is received. The incoming bit stream represents LPC-10 frames containing LPC10 parameters. Forward error correction (FEC) decoding is performed on the incoming bit stream. The incoming bit stream is also decoded by extracting LPC-10 spectrum, pitch, voicing, and gain parameters from the incoming bit stream. The parameters are then distributed to spectrum conversion step 304, voicing conversion step 312, pitch conversion step 316 and gain conversion step 322. Each of these conversion processes will now be described in detail.

a. Spectrum Conversion

The LPC-10 spectrum parameters are referred to as "reflection coefficients" (RCs) whereas the MELP spectrum parameters are referred to as "line spectrum frequencies" (LSFs). The conversion of RCs to LSFs is performed in steps 304, 306, 3108, and 310, and will now be described in detail.

In step 304, the LPC10 reflection coefficients (RC) are first converted to their equivalent normalized autocorrelation coefficients (R). The LPC-10 reflection coefficients (RC) are also converted to their equivalent predictor filter coefficients (A); the predictor filter coefficients (A) are saved for later use in formant enhancement step 308. Both of these conversions (RC→R, RC→A) are performed by using well known transformations. In order to avoid truncation effects in subsequent steps, the autocorrelation conversion (RC→R) recursion is carried out to 50 lags (setting RCs above order 10 to zero). The resulting values for the autocorrelation coefficients (R) are stored symmetrically in a first array.

In step 306, the "preemphasis" is removed from the LPC-10 autocorrelation (R) coefficients. To explain why this is performed, first an explanation of preemphasis is provided as follows. When encoding speech according to the LPC speech coding algorithm standard, an operation known as "preemphasis" is performed on the sampled speech signal prior to spectral analysis. Preemphasis is performed by applying a first order FIR filter prior to spectral analysis. This preemphasis operation attenuates the bass frequencies and boosts the treble frequencies. The purpose of preemphasis is to aid in the computations associated with a fixed point processor; preemphasis makes it less likely for the fixed point processor to get an instability from an underflow or an overflow condition.

Newer speech coding algorithms such as MELP and TDVC do not perform preemphasis because they were designed for modern signal processing hardware that has wider data paths. Therefore, a MELP synthesizer expects spectral coefficients that were produced directly from the sampled speech signal without preemphasis.

Because LPC uses preemphasis, while MELP does not, in step 306 the preemphasis effects are removed from the LPC-10 spectral coefficients. Preemphasis removal is performed as follows. The symmetrical autocorrelation coefficients (HH) of a deemphasis filter are calculated beforehand and stored in a second array matching the format of the first array of autocorrelation coefficients (R) created in step 304. The deemphasis filter is a single pole IIR filter and is generally the inverse of the preemphasis filter used by LPC-10, but different preemphasis and deemphasis coefficients may be used. The LPC-10 standard uses 0.9375 for preemphasis and 0.75 for deemphasis. Because the deemphasis filter has IIR characteristics, the autocorrelation function is carried out to 40 time lags. The autocorrelation values are obtained by convolving the impulse response of the filter.

A modified set of spectral autocorrelation coefficients is calculated via convolving the R values with the HH values as follows:

$$R'(k) = \sum_i R(i+k) * HH(i)$$

The resulting modified autocorrelation coefficients R' will be referred to herein as "deemphasized" autocorrelation coefficients, meaning that the LPC-10 preemphasis effects have been removed. Note that by removing the preemphasis in the correlation domain (i.e. removing the preemphasis from autocorrelation coefficients rather than the reflection coefficients or filter coefficients), computational complexity can be reduced.

The deemphasized autocorrelation coefficients R' are then converted to deemphasized reflection coefficients (RC') and deemphasized predictor filter coefficients (A'), using well known conversion formulas. The stability of the synthesis filter formed by the coefficients is checked; if the filter is unstable, the minimum order stable model is used (e.g. all RC' coefficients up to the unstable coefficient are used for the conversion to A' coefficients). The RC and RC' values are saved for use by the "Compute LPC Gain Ratio" step 320, described further below.

In step 308, formant enhancement is performed. The perceptual quality produced by low rate speech coding algorithms can be enhanced by attenuating the output speech signal in areas of low spectral amplitude. This operation is known as formant enhancement. Formant enhancement sharpens up the spectral peaks and depresses the valleys to produce a crisper sound that is more intelligible. Format enhancement is conventionally performed during the process of decoding the bit stream into an analog speech signal. However, according to the present invention, it has been found that formant enhancement can be used to in the transcoding process 300 to produce a better sounding speech output.

Two methods of formant enhancement are described in detail in sections 12 and 13 below. Section 12 describes a method of formant enhancement performed in the correlation domain. Section 13 describes a second method of formant enhancement performed in the frequency domain. Both formant enhancement methods utilize both the non-deemphasized filter coefficients (A) and the deemphasized filter coefficients (A'). Both methods of formant enhancement produce good results. Which one is preferable is a subjective determination made by the listener for the particular application.

Formant enhancement step 310 outputs "enhanced" deemphasized LPC-10 filter coefficients (A"), wherein the term "enhanced" means that formant enhancement has been performed. The transcoding process of the present invention illustrated in FIG. 3 could potentially be performed without formant enhancement step 308. However, formant enhancement has been found to substantially improve the speech quality and understandability of the MELP output.

In step 310, the enhanced deemphasized LPC-10 filter coefficients (A") are converted to MELP line spectrum frequencies (LSFs). This conversion is made by using well known transformations. In step 310, the MELP LSFs are then adaptively smoothed. With modern vocoders like MELP and TDVC, because of the way the quantization error is handled, the voice often obtains an undesirable vibrato-like sound if smoothing is not performed. Thus, in step 310, a smoothing function is applied to reduce this undesirable vibrato effect. The smoothing function is designed to reduce small fluctuations in the spectrum when there are no large frame-to-frame spectrum changes, Large fluctuations are allowed to pass with minimum smoothing. The following C-code segment is an example of such a smoother. Note that this segment is only an example, and any algorithm having a smoothing effect similar to that described above could be used.

```
for (i=0; i<10; i++) {
    delta = 10.0*(lsp[i] – oldlsp[i]);
    if (delta < 0.0) delta = –delta;
    if (delta > 0.5) delta = 0.5;
    lsp[i] = lsp[i]*(0.5+delta) + oldlsp[i]*(0.5–delta);
}
``` where lsp[i] are the current frame's LSF coefficients, oldlsp[i] are the previous frame's LSF coefficients, and delta is a floating point temporary variable.

MELP also has the provision for encoding the first 10 harmonic amplitudes for voiced speech. These harmonic amplitudes can either be set to zero or generated as follows. U.S. Pat. No. 6,098,036 to Zinser et al., "Speech Coding System and Method Including Spectral Formant Enhancer," discloses a spectral formant enhancement algorithm to generate these harmonic amplitudes. In particular, the process described in columns 17 and 18 can be used to generate 10 amplitudes (amp(k), k=1 . . . 10) from Equation 7 in column 18. Further enhancement may be achieved by utilizing the method described in Grabb, et al., U.S. Pat. No. 6,081,777, "Enhancement of Speech Signals Transmitted Over a Vocoder Channel", and modifying the first three harmonic amplitudes amp(k) according to the values given in FIG. 5 and the accompanying equation.

It was found that generating harmonic amplitudes in this manner produced a superior output quality sound for the TDVC to MELP transcoder (described in section 7, below). However, the improvement for the LPC-10 to MELP transcoder was not as significant. Therefore, for the LPC-10 to MELP transcoder, it may be desirable to simply set the MELP harmonic amplitudes to zero, to reduce computational complexity.

After multiplication by a factor of 2 (to match scaling conventions), the smoothed LSFs are encoded according to the MELP quantization standard algorithm.

b. Voicing Conversion and Jitter Factor Conversion

In step 312, the LPC-10 voicing parameters are converted into MELP voicing parameters. This is not a simple one-to-one conversion because LPC-10 uses only a single voicing parameter, whereas MELP uses several voicing parameters. Thus, a method has been devised according to the present invention for assigning MELP parameters based on the LPC-10 parameters which produces superior sound quality.

The LPC-10 coding standard uses only a single voicing bit per half-frame representing either voiced or unvoiced; i.e., each half-frame is either voiced or unvoiced. In order to provide improved sound quality, the newer MELP coding standard uses seven different voicing parameters: five bandpass voicing strengths, one overall voiced/unvoiced flag, and one voicing parameter called the "jitter flag" which is used to break up the periodicity in the voiced excitation to make the speech sound less buzzy during critical transition periods.

The conversion process of the present invention uses the expanded voicing features of the MELP synthesizer to advantage during transitional periods such as voicing onset, described as follows. The LPC voicing bits are converted to MELP voicing parameters according to three different situations:

(1) mid-frame onset (the first LPC half-frame is unvoiced and the second half-frame is voiced).
(2) fully voiced (both half-frames are voiced).
(3) fully un-voiced mid-frame unvoiced transition (either both half-frames are unvoiced or the first frame is voiced and the second half-frame is unvoiced).

The method is illustrated by the piece of C code below. Testing has found that this method provides the superior sound performance. This method tends to provide a smoother transition from voiced to unvoiced transitions. The following C-code segment illustrates the method of converting LPC-10 voicing bits to the MELP voicing parameters:

```
/* mid-frame onset */
if ((lpc->voice[0]==0) && (lpc->voice[1]==1)) {
```

```
            melp->uv_flag = 0;
        melp->jitter = 0.25;
            for (i=0; i<NUM_BANDS-2; i++)
                melp->bpvc[i] = 1.0;
            melp->bpvc[NUM_BANDS-2] = 0.0;
            melp->bpvc[NUM_BANDS-1] = 0.0;
    }
    /* fully voiced */
    else if ((lpc->voice[0]==1) && (lpc->voice[1]==1)) {
        melp->uv_flag = 0;
        melp->jitter = 0.0;
        for (i=0; i<NUM_BANDS; i++)
            melp->bpvc[i] = 1.0;
    }
    /* fully unvoiced and mid-frame unvoiced transition */
    else {
        melp->uv_flag = 1;
        melp->jitter = 0.25;
        for (i=0; i<NUM_BANDS; i++)
            melp->bpvc[i] = 0.0;
    }
``` where lpc->voice[0] and lpc->voice[1] are the half-frame LPC voicing bits (0=unvoiced), melp->uv_flag is the MELP overall unvoiced flag (0=unvoiced), melp->jitter is the MELP jitter flag, and melp->bpvc[i] are the MELP bandpass voicing strengths. Note that for the transition from unvoiced to voiced, the top two MELP voicing bands are forced to be unvoiced. This reduces perceptual buzziness in the output speech.

In step 314, the MELP voicing and jitter parameters are encoded according to the MELP quantization standard algorithm.

c. Pitch Conversion

In step 316, the LPC-10 pitch parameters are converted to MELP pitch parameters. The LPC-10 coding standard encodes pitch by a linear method whereas MELP encodes pitch logarithmically. Therefore, in step 316, the logarithm is taken of the LPC-10 pitch parameters to convert to the MELP pitch parameters. In step 318, the MELP pitch parameters are encoded using the MELP quantization standard algorithm.

d. Gain (RMS) Conversion

The conversion from LPC-10 RMS gain parameters to MELP gain parameters begins in step 322. In step 322, the LPC-10 RMS gain parameters are scaled to account for the preemphasis removal performed on the LPC-10 spectral coefficients in step 306. To explain, as mentioned previously, LPC-10 coding adds preemphasis to the sampled speech signal prior to spectral analysis. The preemphasis operation, in addition to attenuating the bass and increasing the treble frequencies, also reduces the power level of the input signal. The power level is reduced in a variable fashion depending on the spectrum. Therefore, the effect of removing the preemphasis in step 306 must be accounted for accordingly when converting the gains from LPC to MELP. The preemphasis removal is accounted for by scaling the gains in step 322.

In step 320, an "LPC gain ratio" is calculated for each new frame of parametric data. The LPC gain ratio is the ratio of the LPC predictor gains derived from the spectrum before and after preemphasis removal (deemphasis addition) in step 306. If, $$lpcgain1 = \frac{1}{\sqrt{\prod_i (1 - rc^2(i))}}$$

is defined as the synthesis filter gain before preemphasis removal and:

$$lpcgain2 = \frac{1}{\sqrt{\prod_i (1 - rc'^2(i))}}$$

is defined as the synthesis filter gain after preemphasis removal, then the scaling factor (i.e., the LPC Gain Ratio) to be used for the LPC-10 gain is $$scale = \frac{8 * lpcgain2}{lpcgain1}$$

The factor of 8 is included to accommodate the 13 bit input and output sample scaling in LPC-10 (MELP utilizes 16 bit input and output samples). In step 322, the LPC RMS gain parameter is scaled by the LPC Gain Ratio calculated in step 320.

Steps 324 addresses another difficulty in the gain conversion process which is that MELP uses two gain parameters per frame, whereas LPC uses only one gain parameter per frame. MELP employs a first gain parameter for the first half frame, and a second gain parameter for the second half frame. There thus needs to be a method for assigning the two half-frame MELP gains which produce a good quality sounding output.

A simple method of assigning MELP gains would be to simply set both of the MELP gains equal to the LPC RMS gain. However, it has been found that a better result is obtained if the two MELP gains are generated by taking a logarithmic average of the LPC RMS gains from frame to frame. This is performed in steps 324 and 326. As illustrated by the C-code segment below, the first MELP frame gain is assigned to be equal to the logarithmic average of the old LPC RMS gain from the last frame and the new LPC RMS gain from the current frame. The second MELP gain is set equal to the LPC RMS gain for the current frame. This method of assigning MELP gains provides a smooth transition.

The following C-code segment illustrates this method of calculating the gains:

melp->gain[0]=pow(10.0, 0.5*log 10(*LPCrms*old)+
    0.5*log 10(*LPCrms*));

melp->gain[1]=*LPCrms;*

LPCrms and LPCrmsold represent the scaled LPC RMS gains computed in step 322. LPCrms is the current frame's gain, while LPCrmsold is the previous frame's scaled gain melp->gain[0] and melp->gain[1] are the MELP half frame gains, pow() is the C library power function, and log 10() is the C-library base-10 logarithm function.

In step 326, the logarithmic value of the two MELP gains are provided to encoding step 328. In step 328, the MELP half-frame gains are encoded using the standard MELP logarithmic quantization algorithm.

In step 330, the encoded MELP spectrum, voicing, pitch, and gain parameters are inserted into MELPs frame and forward error correction (FEC) coding is performed. An output bit stream representing the MELP frames is then transmitted to a desired recipient.

3. MELP to LPC Transcoder

Figure 4:
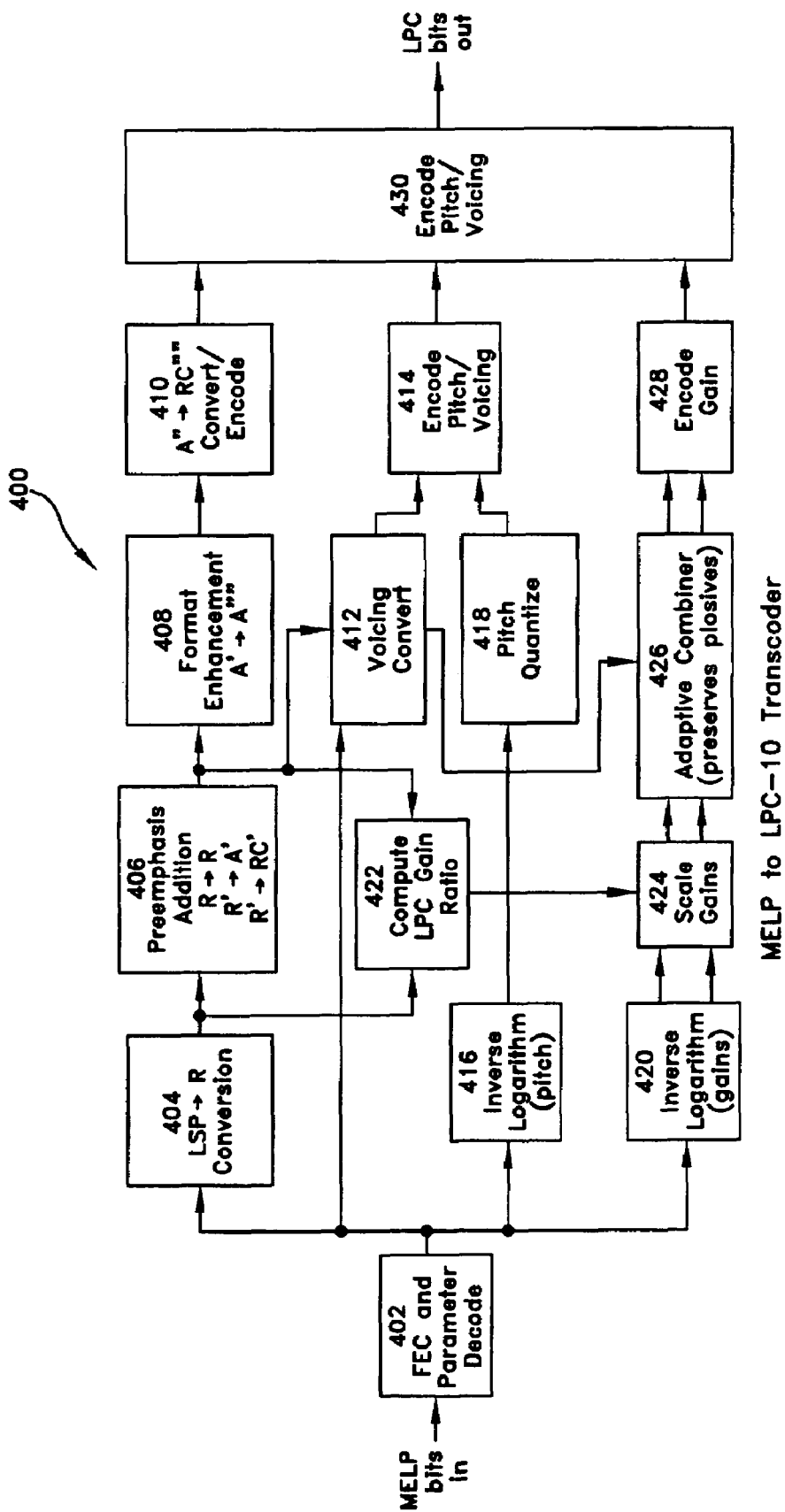
FIG. 4 depicts a block diagram illustrating a MELP-to-LPC transcoding process.

FIG. 4 illustrates a transcoding method 400 for converting a bit stream representing frames encoded with the MELP coding standard to a bit stream representing frames encoded with the LPC-10 coding standard. In step 402, an incoming bit stream is received. The incoming bit stream represents MELP frames containing MELP parameters. In step 402, forward error correction (FEC) decoding is performed on the incoming bit stream. The MELP frames are also decoded by extracting the MELP spectrum, pitch, voicing, and gain parameters from the MELP frames. The MELP parameters are then distributed to steps 404, 412, 416 and 420 for conversion to LPC-10 spectrum, voicing, pitch and gain parameters, respectively. Each of these conversion processes will now be described in detail.

a. Spectrum Conversion

In step 404, the MELP LSFs are converted to their equivalent normalized autocorrelation coefficients R using well known transformations. In step 406, preemphasis is added to the autocorrelation coefficients R. As mentioned previously for the LPC to MELP transcoder (section 2, above), LPC-10 speech encoders add preemphasis to the originally sampled (nominal) speech signal before the LPC-10 spectral analysis and encoding is performed. Thus, transcoder 400 must modify the autocorrelation coefficients R to produce modified autocorrelation coefficients which are equivalent to autocorrelation coefficients that would have been produced had the original nominal speech signal been preemphasized prior to LPC-10 encoding.

The LPC-10 0.9375 preemphasis coefficient must be superimposed on the spectrum. This is performed in the correlation domain by performing the following operation on the autocorrelation (R) coefficients:

$$R'(i)=R(i)-0.9375[R(|i-1|)+R(i+1)]+0.9375^2 R(i)$$

where R'(i) are the preemphasized autocorrelation coefficients. Note that the input set of R(i)s must be computed out to 11 lags to avoid truncation. The preemphasized autocorrelation coefficients R' are then transformed to preemphasized predictor filter coefficients A' using well known transformations. As noted in section 2, above, performing the preemphasis addition in the correlation domain reduces computational complexity.

In step 408, formant enhancement is performed. The purpose of formant enhancement step 408 is the same as formant enhancement step 308 described above for the LPC-10 to MELP transcoder. Two methods of formant enhancement are described in detail in sections 12 and 13 below. Section 12 describes a method of formant enhancement performed in the correlation domain. Section 13 describes a second method of formant enhancement performed in the frequency domain. Both formant enhancement methods utilize both the non-deemphasized filter coefficients (A) and the deemphasized filter coefficients (A'). Both methods of formant enhancement produce good results. Which one is preferable is a subjective determination made by the listener for the particular application. For the MELP to LPC-10 transcoder, the majority of listeners polled showed a slight preference frequency domain method.

In step 410, the formant enhanced preemphasized filter coefficients A" are converted to LPC-10 reflection coefficients RC" using well known transformations. Also in step 410, the reflection coefficients RC" are encoded according to the LPC-10 quantizer tables.

b. Voicing Conversion

In step 412, the MELP voicing parameters are converted to LPC voicing parameters. As mentioned previously, the LPC-10 coding standard uses only a single voicing bit per half-frame, whereas the MELP coding standard uses seven different voicing parameters: five bandpass voicing strengths, one overall voiced/unvoiced flag, and one voicing parameter called the "jitter flag."

Simply using the MELP overall voicing bit to determine both half frame LPC voicing bits does not provide good performance. The voicing conversion process performed in step 412 achieves better perceptual performance by assigning values to the LPC voicing bits based on the MELP bandpass voicing strengths, the MELP overall voicing bit, and the first reflection coefficient RC'[0] (after preemphasis addition) received from preemphasis addition unit 406. A preferred decision algorithm is described by the following C-code segment:

```
lpc->voice[0] = lpc->voice[1] = (melp->uv_flag+1)%2;
flag = 0;
for (i=0; i<NUM_BANDS; i++)
    flag += (int)melp->bpvc[i];
if ((flag <= 4) && (rc'[0] < 0.0))
    lpc->voice[0] = lpc->voice[1] = 0;
``` where lpc->voice[ ] are the half-frame LPC voicing bits (1=voiced), flag is an integer temporary variable, melp->uv_flag is the MELP overall unvoiced flag (0=voiced), melp->bpvc[ ] are the bandpass voicing strengths (0.0 or 1.0, with 1.0=voiced), and rc'[0] is the first reflection coefficient (computed from the spectrum after preemphasis addition).

As illustrated by the above code, initially both LPC voicing bits are set to one (voiced) if the MELP overall unvoiced flag equals zero (voiced). Otherwise, the LPC voicing bits are set to one (unvoiced). To improve the output sound performance, both LPC voicing bits are set to zero (unvoiced) if the first reflection coefficient RC'[0] is negative, and the total number of MELP bands which are voiced is less than or equal to four. The reason this last improvement is performed is as follows. The MELP voicing analysis algorithm will occasionally set a partially voiced condition (lower bands voiced, upper bands unvoiced) when the input signal is actually unvoiced. Unvoiced signals typically have a spectrum that is increasing in magnitude with frequency. The first reflection coefficient RC'[0] provides an indication the spectral slope, and when it is negative, the spectral magnitudes are increasing with frequency. Thus, this value can be used to correct the error.

Note that this type of voicing error is generally not apparent when a MELP speech decoder is used, since the signal power from the unvoiced bands masks the (incorrect) voiced excitation. However, if the error is propagated into the LPC speech decoder, it results in a perceptually annoying artifact.

In step 414, pitch and voice are encoded together using the standard LPC-10 quantization algorithm. According to the LPC standard, pitch and voicing are encoded together.

c. Pitch Conversion

In step 416, the MELP pitch parameter is converted to an LPC-10 pitch parameter by taking the inverse logarithm of the MELP pitch parameter (since the MELP algorithm encodes pitch logarithmically). In step 418, the resulting LPC-10 pitch parameter is quantized according to the LPC-10 pitch quantization table.

In step 414, pitch and voice are encoded together using the standard LPC-10 quantization algorithm.

d. Gain (RMS) Conversion

As described previously, the MELP algorithm produces two half-frame logarithmically encoded gain (RMS) parameters per frame, whereas LPC produces a single RMS gain parameter per frame. In step 420, the inverse logarithm of each MELP half-frame gain parameter is taken. In step 424, the two resulting values are scaled to account for preemphasis addition which occurred in step 406 (similar to the gain scaling step 320 for the LPC-to-MELP transcoder described above). More specifically, both gain values are scaled by the ratio of the LPC predictor gain parameters derived from the spectrum before and after preemphasis addition. This LPC gain ratio is calculated in step 422 for each new frame of parametric data. If $$lpcgain1 = \frac{1}{\sqrt{\prod_i (1 - rc^2(i))}}$$

is defined as the synthesis filter gain before preemphasis addition and $$lpcgain2 = \frac{1}{\sqrt{\prod_i (1 - rc'^2(i))}}$$

is defined as the synthesis filter gain after preemphasis addition, then the scaling factor to be used for both MELP gains is $$scale = \frac{lpcgain2}{8 * lpcgain1}$$

The factor of 8 is included to accommodate the 13 bit input and output sample scaling in LPC-10 (MELP utilizes 16 bit input and output samples). In step 424, both gain values are scaled by the above scaling value. The output of step 424 will be referred to as the "scaled MELP gains."

In step 426, the LPC gain parameter is nominally set to the logarithmic average of the two scaled MELP gains. An adaptive combiner algorithm is then used to preserve plosive sounds by utilizing the LPC-10 synthesizer's ability to detect and activate the "impulse doublet" excitation mode. To explain, LPC-10 synthesizers use an "impulse doublet" excitation mode which preserves plosive sounds like the sounds of the letters 'b' and 'p'. If the LPC synthesizer senses a strong increase in gain, it produces an impulse doublet. This keeps the 'b' and 'p' sounds from sounding like 's' or 'f' sounds.

The algorithm used in step 426 is described as follows. First, the LPC gain parameter is nominally set to the logarithmic average of the two scaled MELP gains. Next, if it is determined that there is a large increase between the first and second half-frame scaled MELP gains, and the current and last transcoded frames are unvoiced, then the LPC gain parameter is set equal to the second half-frame scaled MELP gain. This emulates the adaptively-positioned analysis window used in LPC analysis and preserves LPC-10 synthesizer's ability to detect and activate the "impulse doublet" excitation mode for plosives. In other words, this method preserves sharp changes in gain to allow the LPC synthesizer to reproduce the 'b' and 'p' type sounds effectively.

In step 428, the LPC gain parameter is then quantized and encoded according to the quantizer tables for the LPC-10 standard algorithm.

In step 430, the encoded LPC spectrum, voicing, pitch, and gain parameters are inserted into a LPC frame and forward error correction (FEC) coding is added. An output bit stream representing the LPC frames is produced.

4. LPC to TDVC Transcoder

Figure 5:
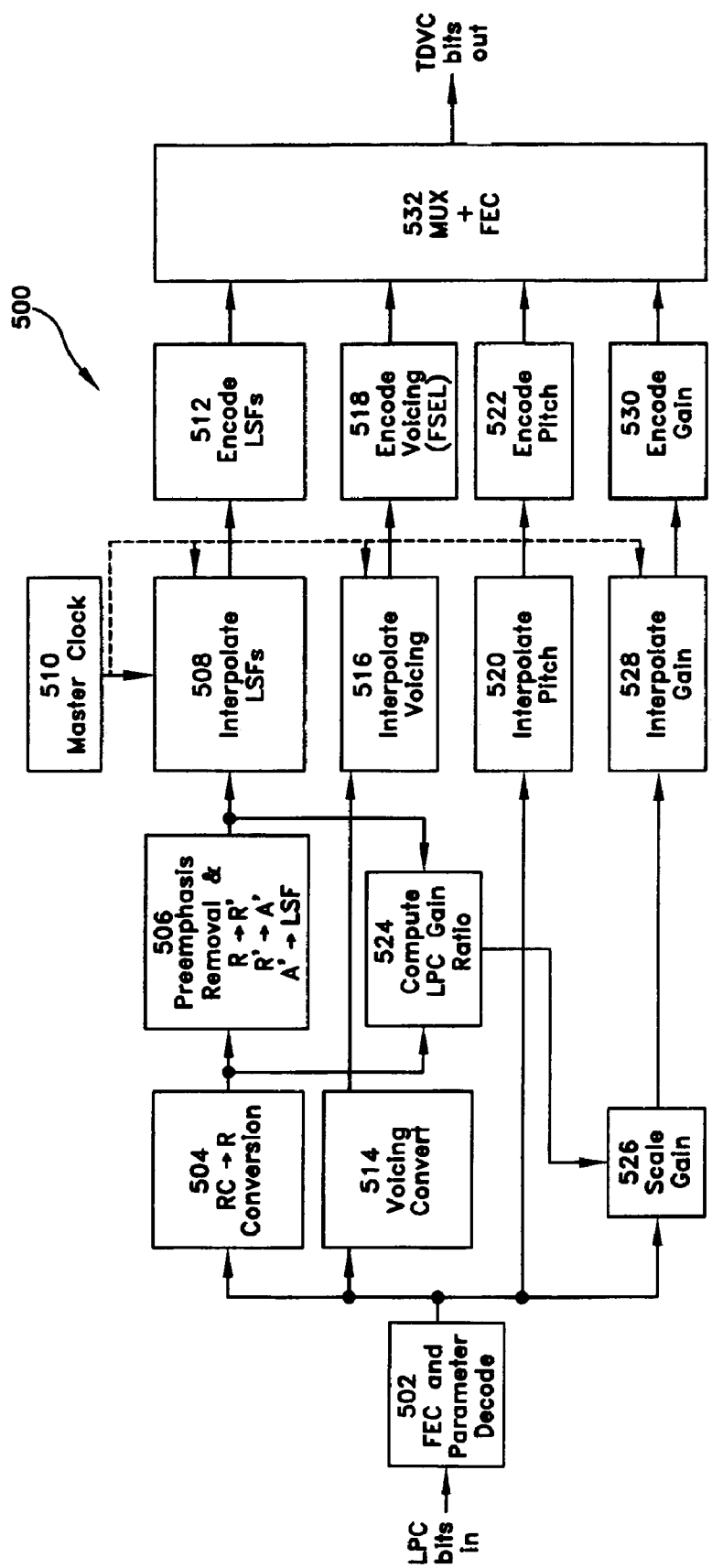
FIG. 5 depicts a block diagram illustrating a LPC-to-TDVC transcoding process.

FIG. 5 illustrates a transcoding method 300 for converting a bit stream representing LPC-10 encoded frames to a bit stream representing TDVC encoded frames. In step 502, an incoming bit stream is received. The incoming bit stream represents LPC-10 frames containing LPC-10 parameters. In step 302, forward error correction (FEC) decoding is performed on the incoming bit stream. The LPC-10 frames are also decoded by extracting the LPC-10 spectrum, pitch, voicing, and gain parameters from the LPC-10 frames. The LPC-10 parameters are then distributed to steps 504, 514, and 526 for conversion to LPC-10 spectrum, voicing, and gain parameters, respectively (no conversion of pitch is necessary as described below). The method of transcoding from LPC-10 parameters to TDVC parameters can be divided into 2 types of operations: 1) conversion from LPC-10 parameters to TDVC parameters, and 2) frame interpolation to synchronize the different frame sizes. The frame interpolation operations are performed in steps 508, 516, 520, and 528 for interpolation of spectrum, voicing, pitch, and gain parameters, respectively. In the discussion that follows, the conversion steps will be discussed first, followed by a discussion of the frame interpolation steps.

a. Spectrum Conversion

While the LPC-10 analysis algorithm applies preemphasis before spectral analysis, the TDVC analysis does not, so the TDVC synthesizer expects spectral coefficients that were extracted from a nominal input signal. Thus, the preemphasis effects must be removed from the LPC spectral parameters.

In step 504, the LPC-10 reflection coefficients (RC) are converted to their equivalent normalized autocorrelation coefficients (R) using well known transformations. In order to avoid truncation effects in subsequent steps, the autocorrelation conversion recursion is carried out to 50 lags (setting RCs above order 10 to zero). The resulting values for the autocorrelation coefficients (R) are stored symmetrically in a first array.

In step 506, the preemphasis is removed in the correlation domain, described as follows. The symmetrical autocorrelation coefficients (HH) of the deemphasis filter are calculated beforehand and stored in an array. The deemphasis filter is a single pole IIR filter and is generally the inverse of the preemphasis filter, but different preemphasis and deemphasis coefficients may be used. The LPC-10 standard uses 0.9375 for preemphasis and 0.75 for deemphasis. Because the deemphasis filter has IIR characteristics, the autocorrelation function is carried out to 40 lags. The autocorrelation values (HH) are obtained by convolving the impulse response of the filter.

A modified set of spectral autocorrelation coefficients is calculated via convolving the R values with the HH values:

$$R'(k) = \sum_i R(i+k) * HH(i)$$

The resulting modified autocorrelation coefficients R' are converted to both reflection coefficients (RC') and predictor filter coefficients (A'). The stability of the synthesis filter formed by the coefficients is checked; if the filter is unstable, the minimum order stable model is used (e.g. all RC's up to the unstable coefficient are used for the conversion to A' coefficients); The RC' values are saved for use by step 524 in calculating the TDVC gain, discussed further below.

The final step in the preemphasis removal process is to convert the deemphasized predictor filter coefficients (A') to line spectrum frequencies (LSF) in preparation for frame interpolation in step 508. Frame interpolation, in step 508, is described in section e. below.

b. Voicing Conversion

In step 514, LPC-10 voicing parameters are converted to TDVC voicing parameters. The TDVC voicing parameter is called the "voicing cutoff frequency parameter" fsel (0=fully unvoiced, 7=fully voiced). The TDVC voicing cutoff frequency parameter fsel indicates a frequency above which the input frame is judged to contain unvoiced content, and below which the input frame is judged to contain voiced speech. On the other hand, LPC-10 uses a simple, half-frame on/off voicing bit.

Step 514 takes advantage of the expanded fsel voicing feature of the TDVC synthesizer during transitional periods such as voicing onset. The following C-code segment illustrates a method of converting LPC-10 voicing bits to TDVC voicing cutoff frequency parameter fsel:

```
/* mid-frame onset */
if ((lpc->voice[0]==0) && (lpc->voice[1]==1))
    fselnew = 2;
/* fully voiced */
else if ((lpc->voice[0]==1) && (lpc->voice[1]==1))
    fselnew = 7;
/* full unvoiced and mid-frame unvoiced transition */
else
    fselnew = 0;
``` where lpc->voice[0] and lpc->voice[1] are the half-frame LPC voicing bits (0=unvoiced), and fselnew is the TDVC fsel parameter. According to the TDVC standard, fselnew=0 corresponds to 0 Hz (DC) and fselnew=7 corresponds to 4 KHz, with each fselnew value equally spaced 562 Hz apart. The effect of the method illustrated by the above code is that when a mid-frame transition from the LPC unvoiced to voiced state occurs, the TDVC voicing output changes in a gradual fashion in the frequency domain (by setting fsel to an intermediate value of 2). This prevents a click sound during voicing onset and thereby reduces perceptual buzziness in the output speech.

c. Pitch Conversion

No conversion is required to convert from the LPC-10 pitch parameter to TDVC pitch parameter; the LPC-10 pitch parameter is simply copied to a temporary register for later interpolation in step 520, described below.

d. Gain (RMS) Conversion

In step 526, an adjustment for preemphasis removal must be made to the LPC gain parameter before it can be used in a TDVC synthesizer. This preemphasis removal process is described as follows.

The LPC gain parameter is scaled by the LPC gain ratio. The LPC gain ratio is calculated in step 524 for each new frame of data. The LPC gain ratio is the ratio of LPC predictor gains derived from the spectrum before and after preemphasis removal (deemphasis addition). If $$lpcgain1 = \frac{1}{\sqrt{\prod_i (1 - rc^2(i))}}$$

is defined as the synthesis filter gain before preemphasis addition and $$lpcgain2 = \frac{1}{\sqrt{\prod_i (1 - rc'^2(i))}}$$

is defined as the synthesis filter gain after preemphasis addition, then the scaling factor (LPC Gain Ratio) to be used for the LPC RMS is $$\text{scale} = \frac{8 * lpcgain2}{lpcgain1}$$

This scale factor is the LPC Gain Ratio. The factor of 8 is included to accommodate the 13 bit input and output sample scaling in LPC-10 (TDVC utilizes 16 bit input and output samples). The scaling performed by step 526 is required because the LPC RMS gain is measured from the preemphasized input signal, while the TDVC gain is measured from the nominal input signal.

e. Frame Interpolation

Because LPC-10 and TDVC use different frame sizes (22.5 and 20 msec, respectively), a frame interpolation operation must be performed. To keep time synchronization, 8 frames of LPC parameter data must be converted to 9 frames of TDVC parameter data. A smooth interpolation function is used for this process, based on a master clock counter 510 that counts LPC frames on a modulo-8 basis from 0 to 7. At startup, the master clock counter 510 is initialized at 0. A new frame of LPC parameter data is read for each count; after all interpolation operations (described below), then "new" LPC parameter data is copied into the "old" parameter data area, and the master clock counter 510 is incremented by 1, with modulo 8 addition. The following interpolation weights are used to generate a set of TDVC parameter data from the "new" and "old" transformed LPC data:

$$wold = 2.5 * \left[\frac{clock}{20}\right]$$

$$wnew = 1.0 - wold$$

Note that at startup (clock=0), wold is set to zero, while wnew is set to 1.0. This is consistent with the LPC frame read schedule, as the contents of the "old" data area are undefined at startup. When the master clock counter 510 reaches 7, two frames of TDVC data are written. The first frame is obtained by interpolating the "old" and "new" transformed LPC data using the weights given by the equations above. The second frame is obtained by using the "old" transformed LPC data only (the same result as if master clock 510 were set to 8). The master clock 510 is then reset to 0 and the process begins again.

The interpolation equations for each TDVC parameter are as follows. Linear interpolation is used for line spectrum frequencies in step 508:

$$lsf(i)=wold *lsfold(i)+wnew*lsfnew(i)$$

where lsfnew( ) and lsfold( ) correspond to the "new" and "old" LSF data sets described above. The voicing parameter fsel is also linearly interpolated in step 516:

$$fsel=wold*fselold+wnew*fselnew$$

Likewise for the pitch in step 520:

$$TDVCpitch=wold*LPCpitchold+wnew*LPCpitchnew$$

Finally, the gain (RMS) is logarithmically interpolated in step 528. Using the scaled LPC RMS values derived above, the TDVC gain can be computed using the following C-code segment:

$$TDVCgain=pow(10.0, wold*\log 10(LPCscaledRMSold)+wnew*\log 10(LPCscaledRMSnew));$$

The interpolated spectrum, voicing, pitch and gain parameters are then quantized and encoded according to the TDVC standard algorithm in steps 512, 528, 522, and 530, respectively. In step 532, the encoded TDVC spectrum, voicing, pitch, and gain parameters are inserted into a TDVC frame and forward error correction (FEC) coding is added. An output bit stream representing the TDVC frames is transmitted.

5. MELP to TDVC Transcoder

Figure 6:
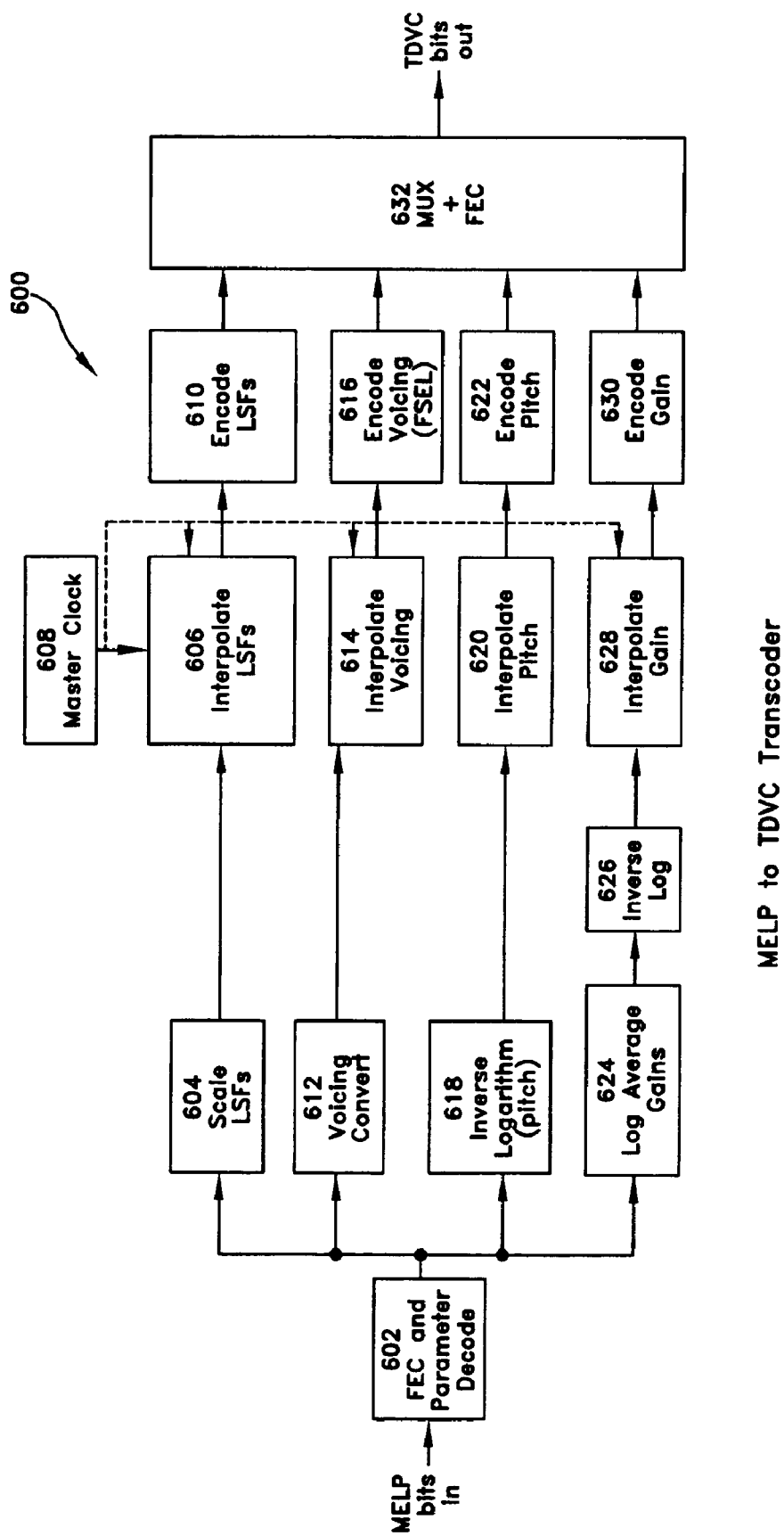
FIG. 6 depicts a block diagram illustrating a MELP-to-TDVC transcoding process.

FIG. 6 illustrates a transcoding method 600 for converting a bit stream representing MELP encoded frames to a bit stream representing TDVC encoded frames. In step 602, an incoming bit stream is received. The incoming bit stream represents MELP frames containing MELP parameters. In step 602, forward error correction (FEC) is decoding performed on the incoming bit stream. The MELP frames are also decoded by extracting the MELP spectrum, pitch, voicing, and gain parameters from the MELP frames. The MELP parameters are then distributed to steps 604, 612, 618 and 624 for conversion to TDVC spectrum, voicing, pitch and gain parameters, respectively The method of transcoding from MELP to TDVC can be divided into 2 types of operations: 1) conversion from MELP parameters to TDVC parameters, and 2) frame interpolation to synchronize the different frame sizes. The frame interpolation operations are performed in steps 606, 614, 620, and 628 for interpolation of spectrum, voicing, pitch, and gain parameters, respectively. In the discussion that follows, the conversion steps will be discussed first, followed by a discussion of the frame interpolation steps.

a. Spectrum Conversion

In step 604, the MELP LSFs are scaled to convert to TDVC LSFs. Since MELP and TDVC both use line spectrum frequencies (LSFs) to transmit spectral information, no conversion is necessary except for a multiplication by a scaling factor of 0.5 (to accommodate convention differences).

b. Voicing Conversion

In step 612, the MELP voicing parameters are converted to TDVC voicing parameters. As described previously, TDVC employs a single voicing cutoff frequency parameter (fsel: 0=fully unvoiced, 7=fully voiced) while MELP uses an overall voicing bit and five bandpass voicing strengths. The TDVC voicing cutoff frequency parameter fsel (also referred to as the voicing cutoff frequency "flag") indicates a frequency above which the input frame is judged to contain unvoiced content, and below which the input frame is judged to contain voiced speech. The value of the voicing cutoff flag ranges from 0 for completely unvoiced to 7 for completely voiced.

The following C-code segment illustrates a conversion of the MELP voicing data to the TDVC fsel parameter by selecting a voicing cutoff frequency fsel that most closely matches the upper cutoff frequency of the highest frequency voiced band in MELP:

```
if (melp->uv_flag == 1)
    fselnew = 0;
else {
    for (i=4; i>=0; i--)
        if (melp->bpvc[i] == 1.0) break;
    r0 = 1000.0*(float)i;
    if (r0 == 0.0) r0 = 500.0;
    if (r0 < 0.0) r0 = 0.0;
    for (i=0; i<=7; i++)
        if (abs((int)((float)i*571.4286 - r0)) < 286) break;
    fselnew = i;
}
``` where melp->uv_flag is the MELP overall unvoiced flag (0=voiced), melp->bpvc[ ] are the bandpass voicing strengths (0.0 or 1.0, with 1.0=voiced), r0 is a temporary floating point variable, and fselnew is the TDVC fsel parameter.

As illustrated by the above code, the highest voiced frequency band in MELP is first identified. The frequency cutoffs for the MELP frequency bands are located at 500 Hz, 1000 Hz, 2000 Hz, and 3000 Hz. The frequency cutoff of the highest voiced band in MELP is used to choose the nearest corresponding value of fsel.

c. Pitch Conversion

In step 618, the MELP pitch parameters are converted to TDVC parameter. Since MELP pitch is logarithmically encoded, the TDVC pitch parameter (pitchnew) is obtained by taking an inverse logarithm of the MELP pitch parameter, as illustrated the following equation:

$$pitchnew=10^{MELPpitch}$$

d. Gain Conversion

In steps 624 and 626, the MELP gain parameters are converted to TDVC. There are 2 logarithmically-encoded half frame MELP gains per frame. These are decoded to linear values and then logarithmically averaged to form a single TDVC gain per frame. (They can also be left in the log domain for averaging to save computational cycles.) The following C-code segment performs this function:

$$gainnew=pow(10.0, 0.5*\log 10(melp->gain[0])+ 0.5*\log 10(melp->gain[1]));$$

where melp->gain[0] and melp->gain[1] are the first and second MELP half-frame gains (respectively), gainnew is the "new" gain (described below in the section on frame interpolation), pow( ) is the C library power function, and log 10 is the C library base-10 logarithm function.

e. Frame Interpolation

Because MELP and TDVC use different frame sizes (22.5 and 20 msec, respectively), an interpolation operation must be performed. To keep time synchronization, 8 frames of MELP parameter data must be converted to 9 frames of TDVC parameter data. A smooth interpolation function is used for this process, based on a master clock counter 608 that counts MELP frames on a modulo-8 basis from 0 to 7. At startup, the master clock counter 608 is initialized at 0. A new frame of MELP data is read for each count; after all interpolation operations (described below), then "new" MELP data is copied into the "old" data area, and the master clock counter 608 is incremented by 1, with modulo 8 addition and "old" transformed MELP data:

$$wold = 2.5 * \left[\frac{\text{clock}}{20}\right]$$

$$wnew = 1.0 - wold$$

Note that at startup (master clock=0), wold is set to zero, while wnew is set to 1.0. This is consistent with the MELP frame read schedule, as the contents of the "old" data are is undefined at startup. When the master clock counter 608 reaches 7, two frames of TDVC data are written. The first frame is obtained by interpolating the "old" and "new" transformed MELP data using the weights given by the equations above. The second frame is obtained by using the "old" transformed MELP data only (the same result as if clock were set to 8). The master clock 608 is then reset to 0 (via the modulo-8 addition) and the process begins again.

The interpolation equations for each TDVC parameter are as follows. Linear interpolation is used for line spectrum frequencies in step 606:

TDVClsf(i)=wold*lsfold(i)+wnew*lsfnew(i)

where lsfnew( ) and lsfold( ) correspond to the "new" and "old" LSF sets described above. The voicing parameter fsel is also linearly interpolated in step 614:

TDVCfsel=wold*fselold+wnew*fselnew

Likewise for the pitch in step 620:

TDVCpitch wold*pitchold+wnew*pitchnew

Finally, the gain (RMS) is logarithmically interpolated in step 628. Using the scaled LPC RMS gain values derived above, the TDVC gain can be computed using the following C-code segment in step 628:

TDVCgain=pow(10.0, wold*log 10(gainold)+
  wnew*log 10(gainnew));

The interpolated spectrum, voicing, pitch, and gain parameters may now be quantized and encoded according to the TDVC standard algorithms in steps 610, 616, 622, and 630, respectively. In step 632, the encoded TDVC spectrum, voicing, pitch, and gain parameters are inserted into a TDVC frame and forward error correction (FEC) coding is added. An output bit stream representing the TDVC frames is transmitted.

6. TDVC to LPC Transcoder

Figure 7:
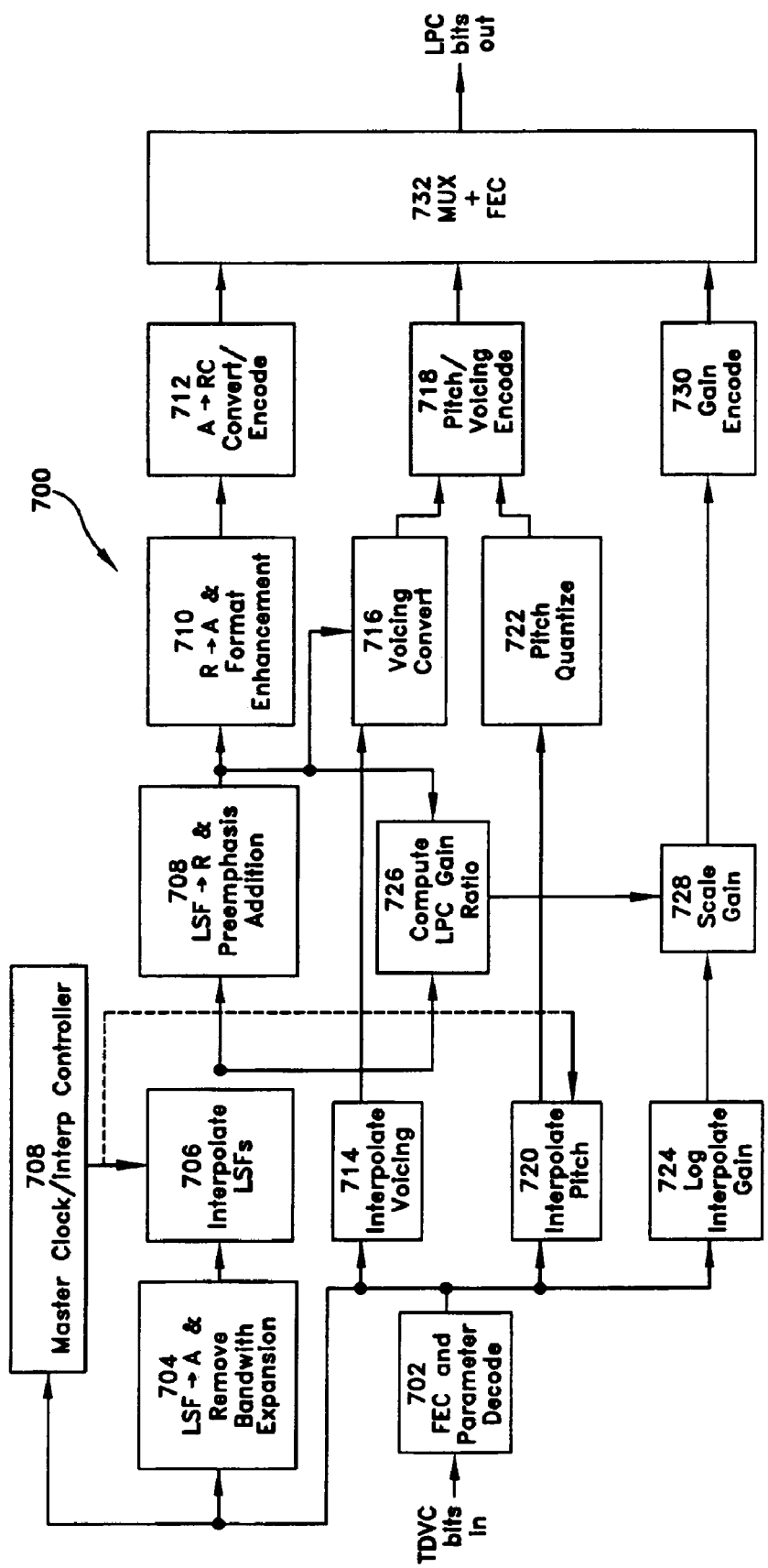
FIG. 7 depicts a block diagram illustrating a TDVC-to-LPC transcoding process.

FIG. 7 illustrates a transcoding method 700 for converting from TDVC encoded frames to LPC-10 encoded frames. The transcoding conversion from TDVC to LPC-10 consists of 2 operations: 1) conversion from MELP parameters to TDVC parameters, and 2) frame interpolation to synchronize the different frame sizes.

In step 702, an incoming bit stream is received. The incoming bit stream represents TDVC frames containing TDVC parameters. In step 702, forward error correction (FEC) decoding is performed on the incoming bit stream. The TDVC frames are also decoded by extracting the TDVC spectrum, pitch, voicing, and gain parameters from the TDVC frames.

a. Spectrum Conversion, Part 1 (Step 704)

In step 704, the TDVC line spectrum frequencies (LSFs) are transformed into predictor filter coefficients (A) using well known transformations. Next, adaptive bandwidth expansion is removed from the TDVC predictor filter coefficients A. Adaptive bandwidth expansion is used by TDVC but not by LPC (i.e., adaptive bandwidth expansion is applied during TDVC analysis but not by LPC analysis). When converting from TDVC to LPC, removing the adaptive bandwidth expansion effects from the spectral coefficients sharpens up the LPC spectrum and makes the resulting output sound better. The adaptive bandwidth expansion is removed by the following process:

1) The original bandwidth expansion parameter gamma is calculated via:

$$\text{gamma} = \text{MIN}\left[1.0, \frac{\text{pitch} - 20}{1000} + 0.98\right]$$

where pitch is the TDVC pitch parameter.

2) Next, the reciprocal of gamma is calculated (rgamma=1.0/gamma).

3) The predictor filter coefficients A are then scaled according to $$a'(i) = (r\text{gamma})^i a(i)$$

4) The new coefficient set a'(i) is checked for stability. If they form a stable LPC synthesis filter, then the modified coefficients a'(i) are used for further processing; if not, the original coefficients a(i) are used.

5) The selected coefficient set (either a(i) or a'(i)) is then converted back into LSFs for interpolation using well known transformations.

b. Frame Interpolation

Because LPC-10 and TDVC use different frame sizes (22.5 and 20 msec, respectively), an interpolation operation must be performed. Interpolation of the spectrum, voicing, pitch, and gain parameters is performed in steps 706, 714, 720, and 724, respectively.

To keep time synchronization, 9 frames of TDVC parameter data must be converted to 8 frames of LPC parameter data. A smooth interpolation function is used for this process, based on a master clock counter 708 that counts LPC frames on a modulo-8 basis from 0 to 7. At startup, the count is initialized to zero. On master clock=0, two sequential TDVC data frames are read and labeled as "new" and "old". On subsequent counts, the "new" frame data is copied into the "old" frame data area, and the next TDVC frame is read into the "new" data area. All TDVC parameters are interpolated using the following weighting coefficients:

$$wnew = 2.5 * \left[\frac{(\text{clock} + 1)}{22.5}\right]$$

$$wold = 1.0 - wnew$$

Note that all parameters are interpolated in their TDVC format (e.g. spectrum in LSFs and voicing in fsel units). This produces better superior sound quality output, than if interpolation is performed in the LPC format.

The following adaptive interpolation technique is also used to improve plosive sounds. If a large change is detected in the TDVC parameters, an adjustment is made to the interpolation weighting coefficients. Specifically, 1) if the spectral difference between the "new" and "old" LSF sets is greater than 5 dB and 2) if the absolute difference between the "new" and "old" fsel parameters is greater than or equal to 5, and 3) the ratio of the "new" and "old" TDVC gain parameters is greater than 10 or less than 0.1, the following adjustment is performed (C-code):

```
if (master_clock <= 3) {
    wnew = 0.0;
    wold = 1.0;
}
else {
    wnew = 1.0;
    wold = 0.0;
}
```

The Interpolation Controller 708 handles this adjustment and changes the weighting coefficients wnew and wold for all four interpolation steps 706, 714, 720, and 724. A illustrated by the above code, if master clock 708 is at the beginning portion of the interpolation cycle (less than or equal to three) then the LPC output parameters (including spectrum, voicing, pitch and gain) will be fixed to the old LPC output. If the clock is at the end portion of the interpolation cycle (greater than three), then the LPC output (spectrum, voicing, pitch and gain) is fixed to the new LPC set. This adjustment emulates the adaptively-positioned analysis window used in LPC analysis and preserves LPC-10 synthesizer's ability to detect and activate the "impulse doublet" excitation mode for plosives. This preserves the sharp difference of plosive sounds and produces a crisper sound.

c. Spectrum Conversion—Part 2

In step 706, interpolation of the spectral coefficients is performed. To generate a single set of LPC spectral coefficients from the "new" and "old" TDVC LSFs, the LSFs are linearly interpolated using the wnew and wold coefficients described above:

$lsf(i)=wold*lsfold(i)+wnew*lsfnew(i)$

To complete the conversion of the spectral parameters, in step 708, preemphasis is added. The LPC-10 0.9375 preemphasis coefficient must be superimposed on the spectrum, since TDVC does not use preemphasis. This is performed in the correlation domain via transforming the interpolated LSFs into predictor coefficients (A) and then transforming the predictor coefficients into their equivalent normalized autocorrelation (R) coefficients and then employing the following operation:

$R'(i)=R(i)-0.9375[R(|i-1|)+R(i+1)]+0.9375^2 R(i)$ where R'(i) are the preemphasized autocorrelation coefficients. Note that the input set of R( )s must be computed out to 11 lags to avoid truncation. The modified autocorrelation coefficients R'(i) are now transformed back to predictor coefficients A'(i) for further processing.

In step 710, formant enhancement is performed on the predictor filter coefficients A'(i). Formant enhancement has been found to improve the quality of the transcoded speech. Two methods of formant enhancement are described in detail in sections 12 and 13 below. Section 12 describes a method of formant enhancement performed in the correlation domain. Section 13 describes a second method of formant enhancement performed in the frequency domain. Both formant enhancement methods utilize both the non-deemphasized filter coefficients (A) and the deemphasized filter coefficients (A'). Both methods of formant enhancement produce good results. Which one is preferable is a subjective determination made by the listener for the particular application. For the TDVC to LPC-10 transcoder, the majority of listeners polled showed a slight preference frequency domain method.

After the formant enhancement has been applied, the predictor filter coefficients A'(i) are converted to reflection coefficients (RCs) by well known transformations and quantized according to the LPC-10 quantizer tables in step 712.

d. Voicing Conversion and Jitter Factor Conversion

Voicing conversion uses the TDVC fsel voicing parameter and the first reflection coefficient RC. First, in step 714, the TDVC fsel voicing cutoff frequency parameter is linearly interpolated using the wnew and wold coefficients described above:

$fsel=wold*fselold+wnew*fselnew$ where fselold is the "old" value of fsel, and fselnew is the "new" value of fsel.

In step 716, the fsel voicing parameter is converted to an LPC voicing parameter. Simply using fsel voicing parameter bit to determine both half frame LPC voicing bits is inadequate. Additional information is required for the best perceptual performance. The preferred decision algorithm is described by the following C-code segment:

```
if (fsel <= 2)
    lpc->voice[0] = lpc->voice[1] = 0;
else
    lpc->voice[0] = lpc->voice[1] = 1;
if ((fsel <= 4) && (rc[0] < 0.0))
    lpc->voice[0] = lpc->voice[1] = 0;
``` where lpc->voice[ ] are the half-frame LPC voicing bits (1=voiced), fsel is the interpolated TDVC fsel voicing parameter (0=fully unvoiced 7=fully voiced), and rc[0] is the first reflection coefficient (computed from the spectrum after preemphasis addition in step 708).

As illustrated by the above code, if the TDVC voicing cutoff frequency parameter fsel is less than or equal to 2, then both LPC half frame voicing bits are set to zero (unvoiced). If fsel is greater than 2, then both LPC half frame voicing bits are set to one (voiced). The exception occurs when fsel<=4 and the first reflection coefficient RC'(0) (after preemphasis addition) is less than zero. In this case, both LPC half frame voicing bits are set to zero (unvoiced). This last exception is implemented to improve the output sound performance. The reason this last improvement is performed is as follows. The TDVC voicing analysis algorithm will occasionally set a partially voiced condition (fsel>0 but fsel<=4) when the input signal is actually unvoiced. Unvoiced signals typically have a spectrum that is increasing in magnitude with frequency. The first reflection coefficient RC'[0] provides an indication the spectral slope, and when it is negative, the spectral magnitudes are increasing with frequency. Thus, this value can be used to correct the error.

Note that this type of voicing error is generally not apparent when a TDVC speech decoder is used, since the signal power from the unvoiced portion of the excitation masks the (incorrect) voiced excitation. However, if the error is propagated into the LPC speech decoder, it results in a perceptually annoying artifact.

In step 718, pitch and voicing are encoded together using the standard LPC-10 encoding algorithm.

e. Pitch Conversion

In step 720, pitch is converted by linearly interpolating the "new" and "old" values of the TDVC pitch to form a single LPC pitch:

LPCpitch=wold*TDVCpitchold+
wnew*TDVCpitchnew

In step 718, pitch and voicing are encoded together using the standard LPC-10 quantization algorithm.

f. Gain (RMS) Conversion

The first step in converting the TDVC gain to LPC RMS is to logarithmically interpolate the the "new" and "old" values of the TDVC gain in step 724 (C-code example):

LPCrms=pow(10.0,wold*log 10(TDVCgainold)+
wnew*log 10(TDVCgainnew));

where LPCrms is the intermediate LPC RMS gain, pow( ) is the C-library power function and log 10 is the C-library base 10 logarithm function.

In step 728, the gain is scaled to account for the preemphasis addition performed on the spectral coefficients in step 708. The following steps are performed to account for preemphasis. First, the intermediate LPC RMS gain value is adjusted by the ratio of the LPC predictor gains derived from the spectrum before and after preemphasis addition. This LPC gain ratio is calculated in step 726 for each new frame of data. If $$lpcgain1 = \frac{1}{\sqrt{\prod_i (1 - rc^2(i))}}$$

is defined as the synthesis filter gain before preemphasis addition and $$lpcgain2 = \frac{1}{\sqrt{\prod_i (1 - rc'^2(i))}}$$

is defined as the synthesis filter gain after preemphasis addition, then the scaling factor to be used for the intermediate LPC gain parameter is $$scale = \frac{lpcgain2}{8 * lpcgain1}$$

The factor of 8 is included to accommodate the 13 bit input and output sample scaling in LPC-10 (TDVC utilizes 16 bit input and output samples). This step is required because the LPC gain is measured from the preemphasized input signal, while the TDVC gain is measured from the nominal input signal.

Additional quality improvements may be obtained by providing a small boost factor for unvoiced signals by utilizing a modified scaling factor:

$$scale' = 1.2 * \left[ \frac{\left(\frac{lpcgain2}{lpcgain1}\right)^{1.2}}{8} \right]$$

In step 730, the LPC RMS gain is then quantized and encoded according to the quantizer tables for the LPC-10 algorithm.

In step 732, the encoded LPC-10 spectrum, voicing, pitch, and gain parameters are inserted into a LPC frame and forward error correction (FEC) is added. An output bit stream representing the LPC frames is produced.

7. TDVC to MELP Transcoder

Figure 8:
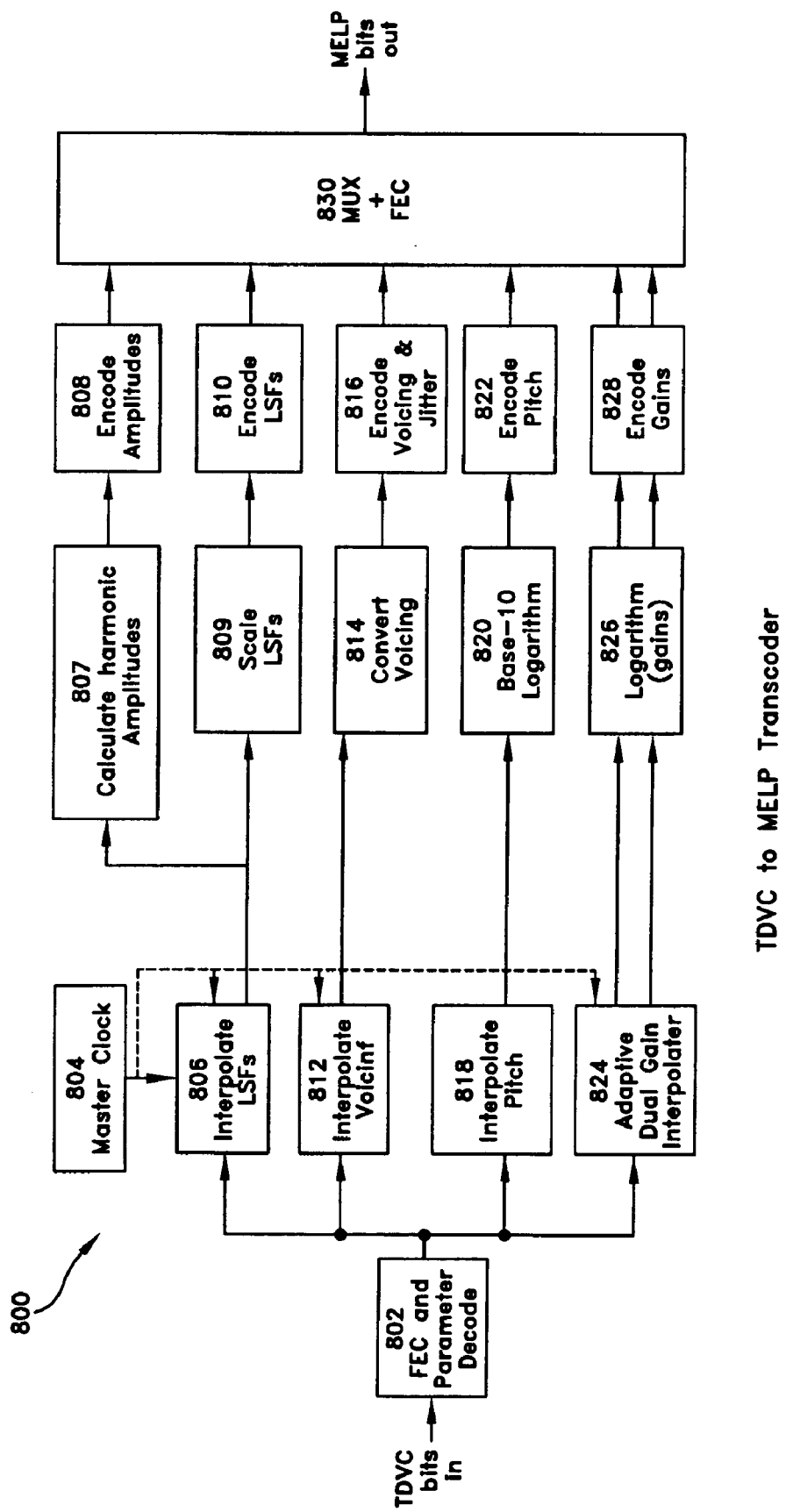
FIG. 8 depicts a block diagram illustrating a TDVC-to-MELP transcoding process.

FIG. 8 illustrates a transcoding method 800 for converting a bit stream representing TDVC encoded frames to a bit stream representing MELP encoded frames. In step 802, an incoming bit stream is received. The incoming bit stream represents TDVC frames containing TDVC parameters. In step 802, forward error correction (FEC) decoding is performed on the incoming bit stream. The TDVC frames are also decoded by extracting the TDVC spectrum, pitch, voicing, and gain parameters from the TDVC frames. The TDVC parameters are then distributed to steps 604, 612, 618 and 624 for conversion to MELP spectrum, voicing, pitch and gain parameters, respectively.

a. Frame Interpolation

The process for converting from TDVC to MELP is shown in FIG. 8. Because MELP and TDVC use different frame sizes (22.5 and 20 msec, respectively), an interpolation operation must be performed. To keep time synchronization, 9 frames of TDVC parameter data must be converted to 8 frames of LPC parameter data. A smooth interpolation function is used for this process, based on a master clock counter 804 that counts MELP frames on a modulo-8 basis from 0 to 7. On count=0, two sequential TDVC data frames are read and labeled as "new" and "old". On subsequent counts, the "new" frame data is copied into the "old" frame data area, and the next TDVC frame is read into the "new" data area. All TDVC parameters are interpolated using the following weighting coefficients:

$$wnew = 2.5 * \left[ \frac{(\text{clock} + 1)}{22.5} \right]$$

$$wold = 1.0 - wnew$$

Note that all parameters are interpolated in their TDVC format (e.g. voicing in fsel units). This was found to produce superior output sound performance.

b. Spectrum Conversion

To generate a single set of MELP LSFs from the "new" and "old" TDVC LSFs, the LSFs are linearly interpolated in step 806 using the wnew and wold coefficients described above:

lsf(i)=2.0*[wold*lsfold(i)+wnew*lsfnew(i)]

The scaling factor of 2.0 is included (scaling is performed in step 809) because the MELP scaling convention is different than that of TDVC. The interpolated LSFs are then quantized and encoded in step 810 according to the MELP standard.

The MELP standard also transmits 10 harmonic amplitude values that are used by the MELP synthesizer for generating voiced speech. U.S. Pat. No. 6,098,036 to Zinser et al., "Speech Coding System and Method Including Spectral Formant Enhancer," (incorporated by reference herein) discloses a spectral formant enhancement algorithm to generate these harmonic amplitudes. The process described in columns 17 and 18 of the above patent can be used to generate 10 amplitudes (amp(k), k=1 . . . 10) from Equation 7 in column 18. Further enhancement may be achieved by utilizing the method described in Grabb, et al., U.S. Pat. No. 6,081,777, "Enhancement of Speech Signals Transmitted Over a Vocoder Channel" (also incorporated herein by reference) and modifying the first three harmonic amplitudes amp(k) according to the values given in FIG. 5 and the accompanying equation. This calculation of harmonic amplitudes is performed in step 807.

In step 808, the calculated harmonic amplitudes are encoded by a MELP harmonic amplitude encoder. This method of generating harmonic amplitudes for provision to the MELP synthesizer could also be used with the LPC-to-MELP transcoder described in section 2, above.

c. Voicing Conversion

Voicing conversion uses the TDVC fsel voicing parameter (fsel=0 indicates fully unvoiced speech, while fsel=7 indicates fully voiced speech). First, the fsel parameter is linearly interpolated in step 812 using the wnew and wold coefficients described above:

$$fsel=wold*fselold+wnew*fselnew$$

Next, the interpolated fsel parameter is converted to the MELP overall voicing bit and bandpass strengths in step 814 using the C-code segment below:

```
if (fsel == 0)
    melp->uv_flag = 1;
else
    melp->uv_flag = 0;
tmp = nint((float)fsel*571.4286/1000.0);
tmp = tmp + 1;
if (fsel < 2) tmp = fsel;
tmp = tmp - 1;
for (i=0; i<=tmp; i++)
    melp->bpvc[i] = 1.0;
for (i=tmp+1; i<=4; i++)
    melp->bpvc[i] = 0.0;
``` where fsel is interpolated TDVC fsel voicing parameter, melp->uv_flag is the MELP overall unvoiced flag (0=voiced), melp->bpvc[ ] are the bandpass voicing strengths (0.0 or 1.0, with 1.0=voiced), nint( ) is the nearest integer function, and tmp is an integer temporary variable. As illustrated by the above code, all of the MELP bands below the TDVC voicing cutoff frequency are set to voiced. The overall voicing bit and the bandpass strengths are then encoded according the MELP standard in step 816.

d. Pitch Conversion

Pitch is converted by linearly interpolating the "new" and "old" values of the TDVC pitch to form a single LPC pitch in step 818:

$$MELPpitch=wold*TDVCpitchold+wnew*TDVCpitchnew$$

In step 820, the logarithm of the pitch is taken. In step 822, the resulting pitch value is then encoded according to the MELP standard.

e. Gain Conversion

The MELP algorithm has the capability to transmit 2 half-frame gains per frame. In step 824, an adaptive dual gain interpolation is performed. This adaptive interpolation is a modification of the wnew/wold interpolation algorithm described above. The wnew/wold interpolation algorithm has been modified to generate these two gains by moving the wnew/wold interpolation weights slightly backward in the clock schedule for the first MELP gain, and slightly forward for the second MELP gain. These modified weights are used for logarithmic interpolation. The following C-code segment illustrates one way to implement this method:

```
wold = wold + 0.1;           /* back up a bit */
if (wold > 1.0) wold = 1.0;
wnew = 1.0 - wold;
melp->gain[0] = pow(10.0, wold*log10(0.01 + tdvc->gain[1]) +
                          wnew*log10(0.01 + tdvc->gain[2]));
wold = wold - 0.2;           /* go forward a bit */
if (wold < 0.0) wold = 0.0;
wnew = 1.0 - wold;
melp->gain[1] = pow(10.0, wold*log10(0.01 + tdvc->gain[1]) +
                          wnew*log10(0.01 + tdvc->gain[2]));
``` where melp->gain[0] and melp->gain[1] are the first and second MELP half-frame gains (respectively), tdvc->gain[1] and tdvc->gain[2] are the "old" and "new" TDVC gains (respectively), pow( ) is the C library power function, and log 10 is the C library base-10 logarithm function. In steps 826 and 828, the two gains are then logarithmically encoded according to the MELP standard.

In step 830, the encoded MELP spectrum, voicing, pitch, and gain parameters are inserted into a MELP frame and forward error correction (FEC) coding is added. An output bit stream representing the MELP frames is produced.

8. Compressed Domain Conference Bridge with Multi-talker Capability

Conference bridging technology has been available for many years to users of the Public Switched Telecommunications Network (PSTN). This technology enables multiple users in remote locations to participate in group discussions. Generally, a conventional bridge uses a summation matrix that supplies an adaptive combination of the incoming signals to each conference participant. The adaptive combination algorithm is designed to attenuate signals from incoming lines that are not actively carrying a voice signal. Therefore, only a signal voice will be carried at any one time in the conventional bridge system.

In both commercial and military applications, it is desirable to have conference bridge functionality available when using very low rate (2.4 kb/sec and below) digital communication channels. Because each conference participant is allotted a maximum of 2.4 kb/sec, the design and implementation of such a bridge poses several challenges. Most of these challenges are caused by the limitations of vocoders operating at low rates. The major issues are:

1. Current-generation 2.4 kb/sec vocoders are unable to transmit multiple talkers simultaneously without near total loss of intelligibility. This precludes use of the conventional summation matrix described above.
2. Conventional conference bridge designs require decoding the incoming 2.4 kb/sec bit stream to a speech waveform for processing (such as speech activity detection). The speech must then be re-encoded for transmission to the participants. This encode/decode/encode/decode process is known a tandem connection and greatly decreases the subjective quality of the speech.
3. To be useful, bridge systems must support multiple coding standards. In most cases, the vocoders are incompatible with each other (e.g. LPC-10, MELP, TDVC). For this reason, direct input to output bitstream transfers cannot be used for interconnection, and the above-mentioned tandem connection is clearly less-than-optimal.

This present invention includes an architecture for a compressed domain conference bridge that surmounts the problems described above. Central to the conference bridge structure is the concept of transcoding between different coding standards, as described in sections 1-7 above. The compressed domain bridge of the present invention is designed to be of low computational complexity in order to keep power consumption as low as possible. This is especially important for space-based applications such as use on satellites.

The basic idea of the compressed domain conference bridge of the present invention is to perform most bridging operations in the compressed (rather than signal) domain. The compressed domain conference bridge is designed to provide most of the services available on a conventional bridge, but maintain full intelligibility for all users (even when there are multiple simultaneous talkers). In addition, multiple types of low-rate vocoder algorithms are supported, including a special hybrid-dual/single talker receiver that will allow a user to hear 2 simultaneous talkers over a single 2400 bit/second channel. This hybrid-dual/single talker receiver is described in detail in section 9, below, and FIG. 10.

a. Parameter Decoding and CDVAD

Figure 9:
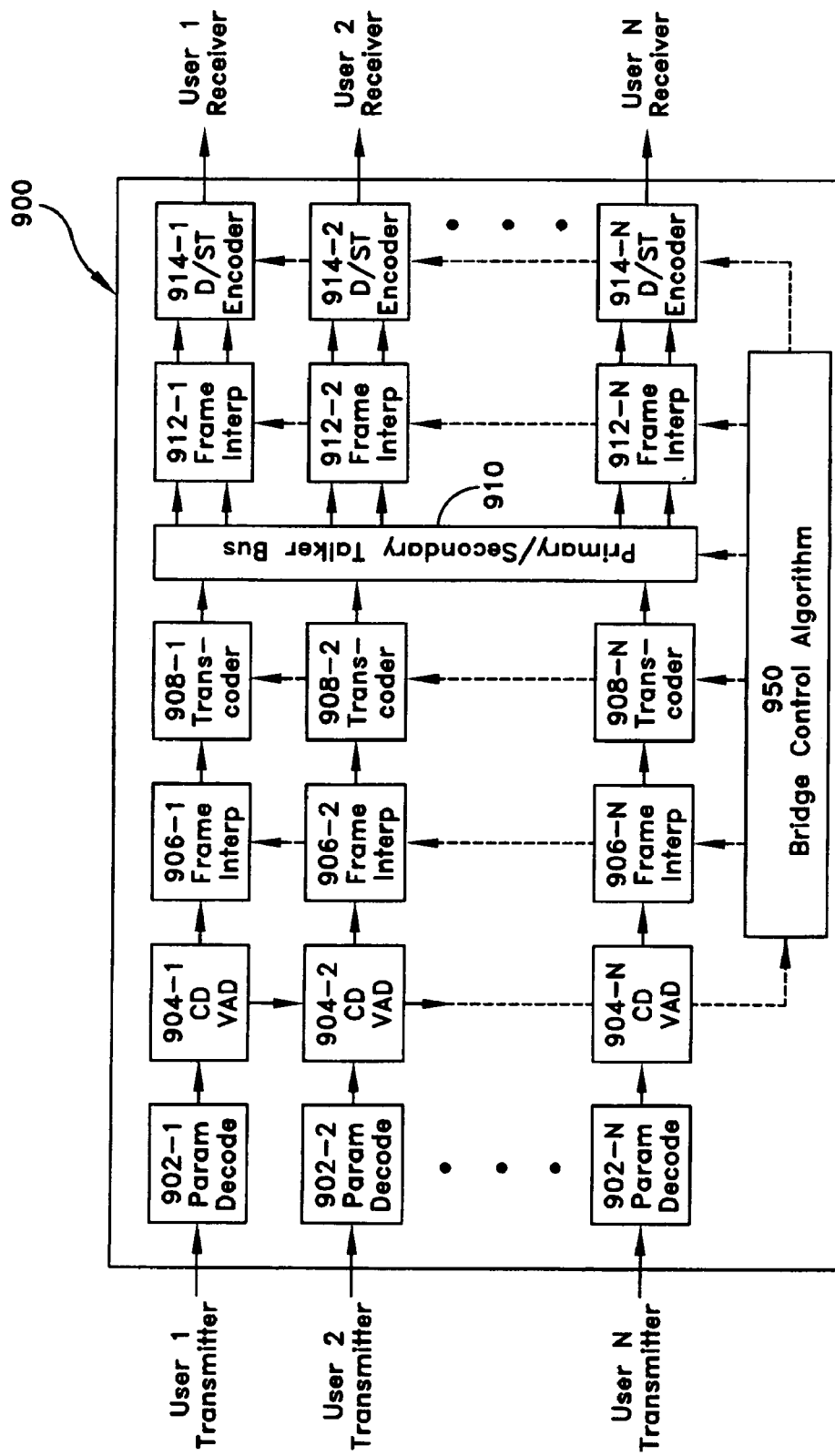
FIG. 9 depicts a block diagram illustrating a Compressed Domain Conference Bridge.

FIG. 9 depicts a block diagram illustrating a typical compressed domain conference bridge 900. The incoming bit streams from N different conference participants (users) are first decoded into vocoder parametric model data by respective parameter decoder units 902 (User 1's transmission bit stream is decoded by decoder unit 902-1, User 2's transmission bit stream is decoded by decoder unit 902-2, and so forth). The parameters for each stream are then analyzed to determine which stream(s) carry an active voice signal by a corresponding Compressed Domain Voice Activity Detector (CDVAD) 904. The Compressed Domain Voice Activity Detector according to the present invention is described in detail in section 10, below.

CDVAD 904 determines which incoming bit streams contain a real voice signal; this information is used by Bridge Control Algorithm 950 to determine which channels contain speech, and thus which channels should be transmitted to the User receivers, as described further below.

b. Frame Interpolation

Because users of the conference bridge may be using different vocoder algorithms that do not necessarily have the same frame size, frame interpolators 906 perform frame interpolation. For example, suppose a user with a 20 msec frame size has to be connected to another user with a 22.5 msec frame size. In this case, frame interpolator unit 104 converts 9 frames of 20 msec parameter data to 8 frames of 22.5 msec data. This is accomplished in a smooth, continuous manner by frame interpolator 906. See the frame interpolation sections in sections 4-7 above for a description of this type of interpolation algorithm.

Note that FIG. 9 shows a frame interpolator 906 on the decoding side of the conference bridge (i.e. to the left of primary/secondary talker bus 910) and a frame interpolator 912 on the encoding side of the conference bridge (i.e. to the right of primary/secondary talker bus 910). Only one of these frame interpolators is necessary. Whether to use a frame interpolator on the encoding side or decoding side of the conference is bridge is a choice based on which location produces the best perceptual quality in the output speech.

c. Bridge Control and Multi-Talker Capability

Bridge control algorithm 950 next determines which incoming channels will be converted for transmission over the bridge to the receivers. Here we introduce the concept of the primary and secondary talker channels. Previous research has shown that during typical voice conferences, there are rarely more than two participants talking at once. Consequently, the compressed domain bridge 900 has been designed around this factor, with the capability to transmit two simultaneous talkers to participants. This design also yields significant savings in computational complexity, because a maximum of 2 users per vocoder type must be encoded for transmission.

A note on the conference participant's equipment is in order here. The current implementation of the bridge is designed to work with several different types of vocoders (e.g. LPC-10, MELP, and TDVC), including the hybrid-dual/single talker (D/ST) receiver mentioned above and described in section 9, below. The D/ST receiver is capable of receiving and decoding a single talker bitstream (at approximately 2400 b/sec) or a dual talker bitstream (2×1200 b/sec), and dynamically switching between the two formats as the call progresses. The switching is accomplished without artifacts or noticeable degradation.

During the course of a conference call, if only one participant is speaking, then the bridge sends the D/ST receiver a single talker stream. If two participants are speaking simultaneously, the bridge will send the D/ST receiver the vocoder parameters for both participants in the 2×1200 b/sec dual talker format. The reason for designing the system in this fashion is that the reproduction quality for the 1200 b/sec format is not as good as the 2400 b/sec single talker format. By switching dynamically between the two formats, the system can continuously provide each user with the highest quality reproduction given the input conditions.

Another desirable feature for a conference bridge is the ability to assign priorities to the participants to regulate access to retransmission over the bridge. A participant with a higher priority will take precedence over a lower priority user when both are talking at the same time. To accommodate prioritization and the dual speaker mode of operation described above, the concept of primary and secondary talker channels has been developed. The talker channels are selected using 1) the pre-set priority of each user for retransmission, and 2) which users are actually talking (as indicated by the CDVAD units 904). The bridge control algorithm 950 selects the primary and secondary talkers using the following algorithm:

No user talking: highest priority user is primary second highest priority user is secondary 1 user talking: talking user is primary non-talking user with highest priority is secondary 2 users talking: highest priority talking user is primary other user who is talking is secondary >2 users talking: highest priority talking user is primary second highest priority talking user is secondary Note that there are always primary and secondary talker channels selected, even if there are no users actively talking. This ensures that the conference bridge will always function like a normal full-duplex telephone call if there are only 2 users. For calls with more than 2 users, all non-talking users on the bridge will receive either the primary or the combined primary and secondary signals (if they have D/ST capability).

There are a few special rules applying to the selected primary and secondary talkers. The first rule is that the primary talker's audio is never transmitted back to his/her receiver. The primary talker will always receive the secondary talker's audio. In a similar fashion, the secondary talker will always receive the primary talker's audio. To minimize potential user confusion, a primary or secondary talker is not allowed to receive a dual-talker bitstream (this would require a third talker path through the bridge if the first 2 rules are applied, and some participants would be receiving different streams than others).

d. Transcoding

After the primary and secondary talker channels are selected by bridge control algorithm 950, the decoded vocoder parameters for the primary and secondary talker channels can be loaded into associated parameter structures for transcoding by transcoders 908. Transcoding is necessary when there are users with different vocoder types are participating in the conference. Some different types of transcoding operations in the compressed domain are fully described in sections 1-7.

Transcoding is performed by the transcoder 908 in the corresponding primary talker channel and the transcoder 908 in the corresponding secondary talker channel. For example, if bridge control algorithm 950 determines that user 2 is the primary talker channel, and user 7 is the secondary talker channel, then transcoder 908-2 performs transcoding of channel 2 and transcoder 908-7 performs transcoding of channel 7, if transcoding is necessary.

Each transcoder 908 can be configured by bridge control algorithm 950 to perform one or more desired transcoding conversions. For example, suppose user 1 is determined to be the primary talker channel, and user 1 is transmitting a MELP-encoded bit stream. One of the user receivers connected to the conference bridge is an LPC receiver, and one user receiver is a TDVC receiver. Bridge control algorithm 950 then configures transcoder 908-1 to convert user 1's bit stream from MELP to LPC, and from MELP to TDVC. Thus two versions of user 1's bit stream are created: one encoded with LPC and one encoded with TDVC. In this example, transcoder 908-1 is said to have two "transcoder structures." One transcoder structure converts MELP to LPC, and the other structure converts MELP to TDVC.

The maximum number of transcoder structures required for each transcoder 908 is dependent on the number of different vocoder types on the system and whether any users have dual speaker capability. Because of the primary/secondary talker channel architecture, the number of transcoder structures is not dependent on the number of users. This feature yields a significant memory savings in implementation. The table below gives the maximum number of transcoder structures, taking into account the rules given in the last paragraph.

|  | 1 coder type in call | 2 coder types in call | 3 coder types in call |
| --- | --- | --- | --- |
| no D/ST users | 0 | 2 | 3 |
| at least 1 D/ST user | 0 | 2 | 4 |

Because the selection of primary and secondary talkers changes during the course of the call, the transcoding operation also changes dynamically. A hash table may be used to keep track of conversion operations handled by each allocated transcoder structure. These structures have a 1-frame vocoder parameter memory. When the configuration changes, the memory must be preserved under certain conditions. If the user who was assigned to secondary talker channel is reassigned to the primary talker channel, the memory from the secondary structure must be transferred to that of the primary. In a similar fashion, if the primary structure memory must be copied to that of the secondary if the opposite switch occurs. Finally, if a "new" user is selected for the primary or secondary talker channel, the associated structure memory is reinitialized.

e. Dual/Single Talker Encoding

After transcoding, the bit streams from the primary talker and secondary talker channels are distributed to the receivers via primary/secondary talker bus 910. The bridge control algorithm 950 checks to see if there are any valid D/ST users on the system who are eligible to receive a dual-talker format. If the dual-talker conditions (described above) are satisfied, then the eligible users receive both the primary and secondary talkers in the dual-talker format. If a receiver does not have D/ST capability, then only the primary talker is received.

For each D/ST eligible receiver, D/ST encoder 914-1 encodes the bit streams for the primary and second talker channels into a dual-talker format. The dual-talker format consists of two 1200 b/sec channels, one each for the primary and secondary talker channels. The low bit rate for each channel is achieved by utilizing three frames of vocoder parameter data and encoding the most recent two frames at one time. The details of this encoding technique is described in section 11, below.

Care must be taken when switching between dual and single talker modes. Because two frames are encoded at a time in dual-talker mode, a switch to single-talker mode cannot occur during every other frame. Additional concerns arise when the users assigned to the primary talker channel and secondary talker channel change. Because there are 2 frames of vocoder parameter memory in the dual-talker encoder, primary/secondary memory interchanges or re-initialization must be performed to ensure continuity (as described above in section d).

f. Other Bridge Functions and Notes

The relative loudness of each talker can be adjusted through manipulation of the vocoder gain or RMS parameter. Because the gain parameters may represent different quantities for different vocoder algorithms, they must be compared on an equal basis. Sections 1 through 7 above (transcoder descriptions) describe how to convert from one gain format to another.

A "tone" control function can be applied to emphasize one talker over another. This can be accomplished through correlation domain convolution of the spectral prediction coefficients with the desired "tone" shaping filter. For an example of how this is preformed, see section 2a, above (the preemphasis removal in section 2a is performed by correlation domain convolution of the spectral prediction coefficients, and the same technique can be applied here using a tone shaping filter).

Because the TDVC encoder uses a predictive mode spectral LSF quantizer, special care must be taken when the primary and/or secondary talkers are changed and when there are dual to single talker transitions. Continuity is preserved with memory interchanges and predictor state resets, as described in sections d and e, above.

9. Hybrid Dual/Single Talker 2400 b/sec Speech Synthesizer

A hybrid dual/single talker 2400 b/sec speech synthesizer, hereafter referred to as the "dual synthesizer," produces a digital audio stream by decoding a compressed bit stream that contains, on a frame by frame basis, encoded parameters describing either a single talker's voice input or encoded parameters describing two simultaneous talker's voice inputs. The means by which a dual talker compressed bit stream is generated is described in section 11, below. The dual synthesizer is able to decode such dual-talker bit streams and handle transitions from dual-talker to single-talker modes and vice versa without introducing objectionable artifacts (audible defects) in the output audio.

For the purposes of description, the dual synthesizer is described below in the context of TDVC, although the dual synthesizer could use any other coding standards such as LPC-10 or MELP.

The compressed bit stream that is input to Dual Synthesizer 1000 is divided into "packets" of two different types: an "S" packet type and a "D" packet type. The two types of packets are structured as follows:

S<35 bits>

D<48 bits Talker 1><48 bits Talker 2>

'S' and 'D' represent a one bit tag for either a Single or Dual Talker packet. In the context of Single Talker TDVC, a packet contains bits representing a single 20 ms segment of speech. For Dual Talker mode, however, a packet contains a 48-bit "sub-packet" for each talker that actually represents two consecutive 20 ms segments of speech.

The dual synthesizer contains two independent TDVC synthesizers (referred to as primary and secondary synthesizers), and is operating in either Single or Dual Talker mode at any given time. The primary synthesizer is active for both Single and Dual Talker mode, while the secondary synthesizer is active only for Dual Talker mode.

Figure 10:
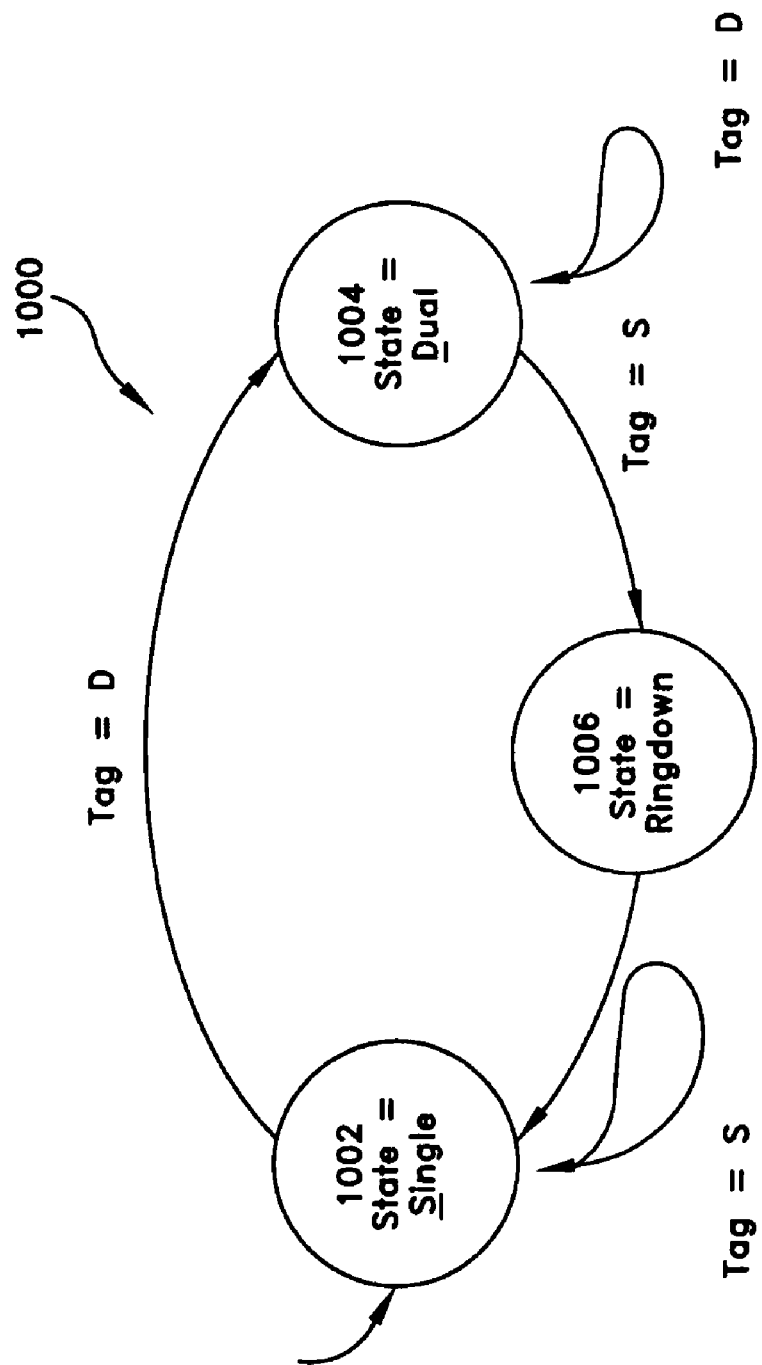
FIG. 10 depicts a dual synthesizer state diagram.

The Dual Synthesizer operates according to the state diagram 1000 shown in FIG. 10. In state diagram 1000, the initial operating mode is assumed to be Single state 1002. As long as 'S' packets are received, the Dual Synthesizer stays in this mode. When a 'D' packet is received, the operating mode is switched to Dual state 1004. Special processing to accomplish the transition is described below. As long as 'D' packets are received, the operating mode is Dual mode 1004. When an 'S' packet is received, the operating mode switches to "Ringdown" mode 1006 for a small number of frames, sufficient to let the output of the synthesis filter for the discontinued talker to ring down. Special transition processing for this transition is also described below.

a. Single to Dual State Transition Processing

It is assumed that the Single Mode talker becomes one of the Dual Mode talkers, as will be the case in the great majority of instances. Because no bits are transmitted to identify whether the Single Mode talker becomes Dual Mode talker 1 or 2, calculations are performed in order to make a "best guess" determination. Tracking the Single Mode talker into Dual Mode is desirable so that no unnecessary discontinuities are introduced into the synthesized speech for this talker.

Line Spectral Frequencies coefficients (LSFs), pitch, and gain parameters for both Dual Mode Talkers are decoded. A similarity measure is computed between the decoded parameters for each Dual Mode talker and the last set of Single Mode parameters, as illustrated by the following code excerpt:

```
sim1 = sim2 = 0.0;
d1 = euclidian_distance( singlemode_lsf, talker1_lsf, MM );
d2 = euclidian_distance( singlemode_lsf, talker2_lsf, MM );
sim1 = d1/(d1+d2);
sim2 = d2/(d1+d2);
sim1 += (float)abs(singlemode_pitch - talker1_pitch)
      / (float)(singlemode_pitch + talker1_pitch);
sim2 += (float)abs(singlemode_ipitch - talker2_pitch)
      / (float)(singlemode_ipitch + talker2_pitch);
d1 = fabs(log(singlemode_gain+20.) - log(talker1_gain+20.));
d2 = fabs(log(singlemode_gain+20.) - log(talker2_gain+20.));
sim1 += d1/(d1+d2);
```

-continued

```
sim2 += d2/(d1+d2);
if ( sim1 > sim2 ) {
    /* Single Mode talker has become Dual Mode talker 2 */
    swap_synthesizer_states( );
}
```

In the code excerpt above, sim1 and sim2 are the similarity measures for Dual Mode talkers 1 and 2, respectively. When sim1 is the smaller of the two, nothing needs to be done, since the Single Mode talker parameters and Dual Mode talker 1 parameters are both processed by the primary synthesizer. However, when sim2 is smaller, the state of the secondary synthesizer is copied over that of the primary before any processing takes place. The secondary synthesizer is reinitialized to a quiescent state before processing in both cases.

b. Dual to Single State Transition Processing

The procedure for handling the Dual to Single Mode transition is very similar to the procedure for the Single to Dual Mode transition. In this case, it is assumed that one of the Dual Mode talkers will continue as the Single Mode talker. Once again, parameters are decoded, and similarity measures are computed in precisely the same manner as illustrated above. If it appears that Dual Mode talker 1 has become the Single Mode talker, then nothing need be done; however if it appears that Dual Mode talker 2 has become the Single Mode talker, the state of the secondary synthesizer is copied over the state of the primary synthesizer.

10. Compressed Domain Voice Activity Detector

Voice Activity Detection (VAD) algorithms are integral parts of many digital voice compression (vocoder) algorithms which are used for communication and voice storage applications. The purpose of a VAD is to detect the presence or absence of voice activity in a digital input signal. The task is quite simple when the input signal can be guaranteed to contain no background noise, but quite challenging when the input signal may include varying types and levels of background noise. Many types of VAD have been designed and implemented. Some VAD algorithms also attempt to classify the type of speech that is present in a short time interval as being either voiced (e.g. a vowel sound, such as long e) or unvoiced (e.g. a fricative, such as 'sh'). Once the VAD has classified an interval of the input signal, the vocoder can tailor its operation to the classification. For example, depending on the classification, a vocoder might encode an input signal interval with more, less, or even no bits (in the case of silence).

The object of the compressed domain voice activity detector (CDVAD) of the present invention as described herein is to perform the Voice Activity Detection function given a compressed bit stream (produced by a vocoder) as input, rather than a time domain waveform. Conventional VAD algorithms operate on a time domain waveform. For an example of a conventional VAD algorithm which operates in the signal domain, see Vahatalo, A., and Johansson, I., "Voice Activity Detection for GSM Adaptive Multi-Rate Codec," *ICASSP* 1999, pp. 55-57.

The Compressed Domain VAD (CDVAD) of the present invention decodes the compressed bit stream only to the level of vocoder parametric model data, rather than decoding to a speech waveform. Decoding to vocoder parameters has the advantage of requiring much less computation than decoding to a speech waveform.

The CDVAD can be used in conjunction with the Compressed Domain Conference Bridge 900, described above in section 8. The bridge, and by extension the VAD component, must be of low computational complexity in order to keep power consumption as low as possible on the satellite. As described previously, the bridge receives a plurality of compressed voice bit streams (which need not have been produced by the same type of vocoder), determines which bit streams contain voice activity, and use decision logic to select which bit stream(s) to transmit to the conference participants.

The CDVAD disclosed herein incorporates a modern, fairly conventional VAD algorithm, but adapts it to operate using compressed voice parameters rather than a time domain speech waveform. The CDVAD can be adapted to operate with compressed bit streams for many different vocoders including TDVC, MELP and LPC-10.

Figure 11:
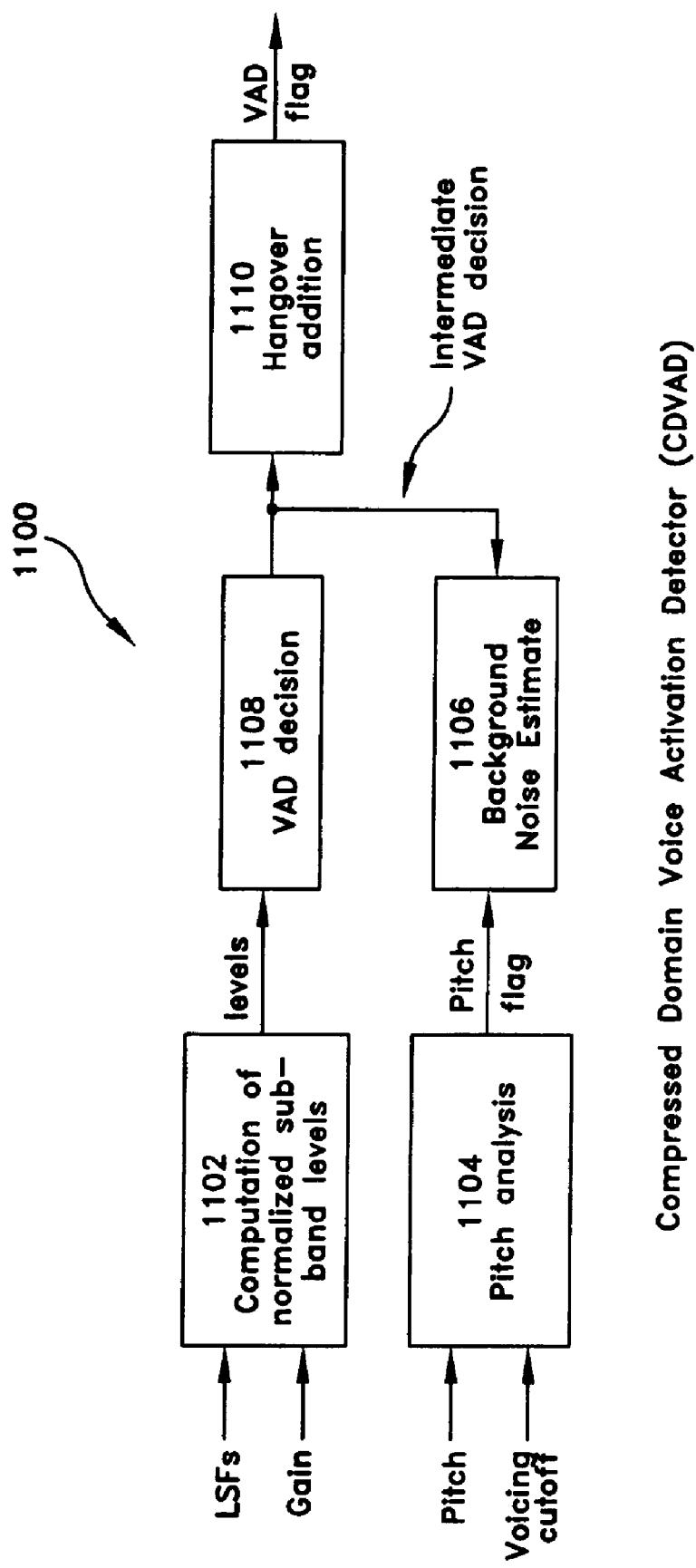
FIG. 11 depicts a Compressed Domain Voice Activation Detector (CDVAD).

FIG. 11 depicts a block diagram illustrating a CDVAD method 1100. CDVAD method 1100 will first be described with respect to a bit stream representing TDVC parameters. Each frame of TDVC parameters represents 20 ms segment of speech. In adapting the CDVAD to the other vocoder types (e.g. LPC and MELP), only minor transformations of their native parameter sets are required, as described below.

As shown in FIG. 11, CDVAD 1100 receives 4 types of TDVC parameters as inputs: 1) a set of 10 short term filter coefficients in LSF (Line Spectral Frequency) form, 2) frame gain, 3) TDVC-style voicing cutoff flag, and 4) pitch period. As described previously, the TDVC-style voicing cutoff flag 1106 indicates a frequency above which the input frame is judged to contain unvoiced content, and below which the input frame is judged to contain voiced speech. The value of the voicing cutoff flag ranges from 0 for completely unvoiced to 7 for completely voiced.

To adapt LPC-10's parameters to the CDVAD, three conversions must be performed. LPC-10's short term filter coefficients are converted from reflection coefficients to LSFs, the frame gain is scaled to adjust for pre-emphasis and different system scaling conventions, and LPC-10's half-frame voicing flags are boolean-OR'ed to make them compatible with the TDVC-style voicing cutoff flag.

To adapt MELP's parameters to the CDVAD is somewhat easier, because MELP & TDVC both use the LSF representation of short term filter coefficients. MELP uses two half-frame gains rather than a single frame gain value as in TDVC; the larger of MELP's two half-frame gain values is used as the overall frame gain by the CDVAD. MELP's band pass voicing information is converted to a TDVC-style voicing cutoff flag using a simple mapping similar to the conversion described in section 5b, above (MELP to TDVC transcoder).

The CDVAD operation is based on spectral estimation, periodicity detection, and frame gain. The basic idea of the CDVAD shown in FIG. 11 is to make the VAD decision based on a comparison between input signal level and a background noise estimate for each of a plurality of frequency bands, while also taking into account overall frame gain, voicing cutoff frequency, and pitch information.

In step 1102, the spectral envelope for a frame is computed from the input short term filter coefficients (LSFs). From the spectral envelope, signal levels are computed for each of a number of frequency sub-bands. The signal levels are then normalized by both the overall frame gain and the gain of the short term filter.

In step 1104, a "pitch flag" is set for the current frame only if the pitch has been relatively constant over the current and 2 or more immediately preceding frames. In addition, for the pitch parameter to be considered valid, the voicing cutoff flag fsel must be greater than 0 (i.e. not fully unvoiced).

In step 1106, the background noise level is estimated for each sub-band. The normalized sub-band levels from step 1102 and intermediate VAD decision for the current frame (produce by step 1108, discussed below) for the current frame are received as inputs to step 1106. The background noise sub-band levels are updated with a weighted sum of their current value and the input sub-band levels. However, the weights for the summation are varied, depending on several conditions:

1) If the intermediate VAD decision=1, indicating the probable presence of speech, the weights are set such that the background noise sub-band levels can only be updated downwards, to avoid corruption of the background noise estimate.
2) If the last several (e.g. 4) frames' intermediate VAD decision=0, indicating the probable absence of speech, the weights are set such that the background noise sub-band levels update (upwards or downwards) relatively quickly.
3) If the VAD decision has been=1 for a large number of frames, but the input sub-band levels have shown little variation, the weights are set such that the background noise sub-band levels update relatively slowly. This case is exercised both at startup, and when there is an abrupt increase in background noise levels.

In step 1108, an intermediate VAD decision for the current frame is made. Given the normalized sub-band levels from step 1102, and the background noise estimate from step 1106, a signal to noise ratio is computed for each sub-band. The ratios are then summed and compared against an experimentally determined threshold. The threshold is set higher for high background noise situations, and lower for low background noise situations. If the sum is greater than the threshold, voice activity is detected and the intermediate VAD decision is set=1, otherwise it is set=0. The intermediate VAD decision is provided to steps 1106 and 1110.

In step 1110, hangover addition is performed. Hangover addition applies some smoothing to the intermediate VAD decision, to try to ensure that the ends of utterances, some of which are quite low amplitude, are not cut off by the VAD. Hangover addition also removes isolated VAD=0 decisions from the middle of active speech regions. If a sufficient number $H_1$, of consecutive frames have an intermediate VAD decision=1, hangover is enabled, and the final VAD decision will be held=1 until $H_2$ consecutive frames with intermediate VAD decision=0 are encountered.

11. Low Rate Multi-frame Encoder and Decoder

Described as follows is a method for ultra-low rate encoding and decoding of the parameters used in predictive-style parametric vocoders (e.g. MELP, LPC, TDVC). Although the method of ultra-low rate encoding described herein produces a degradation in sound quality, it is very useful for applications where an ultra-low rate is needed. As described previously, one application for this ultra-low rate encoding method is for use in a dual-talker system that will allow a user to hear 2 simultaneous talkers over a single 2400 bit/second channel (the dual-talker format consists of two 1200 b/sec channels within the 2400 b/sec channel).

These encoding and decoding methods are described in the following four sections for pitch, gain, spectrum and voicing parameters. The encoding and decoding methods are described below with respect to the TDVC coding standard. However, the methods can be applied to any coding standards using pitch gain, spectrum and frequency parameters.

a. Pitch Encoding and Decoding

Figure 12B:
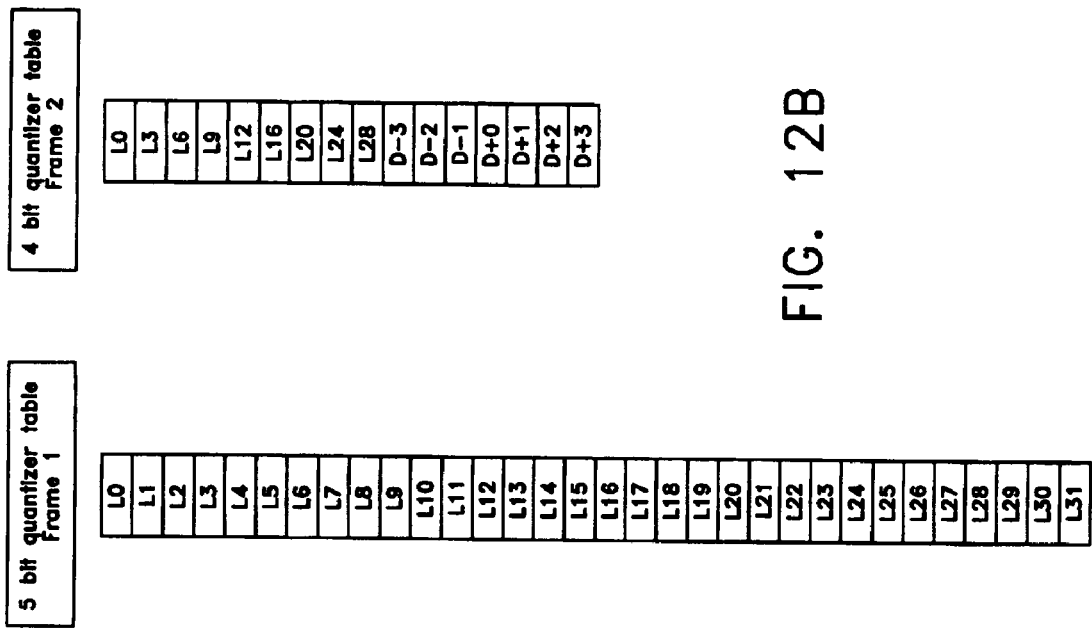
FIG. 12B depicts 5-bit and 4-bit quantizer tables used for multi-frame gain encoding and decoding.
Figure 12A:
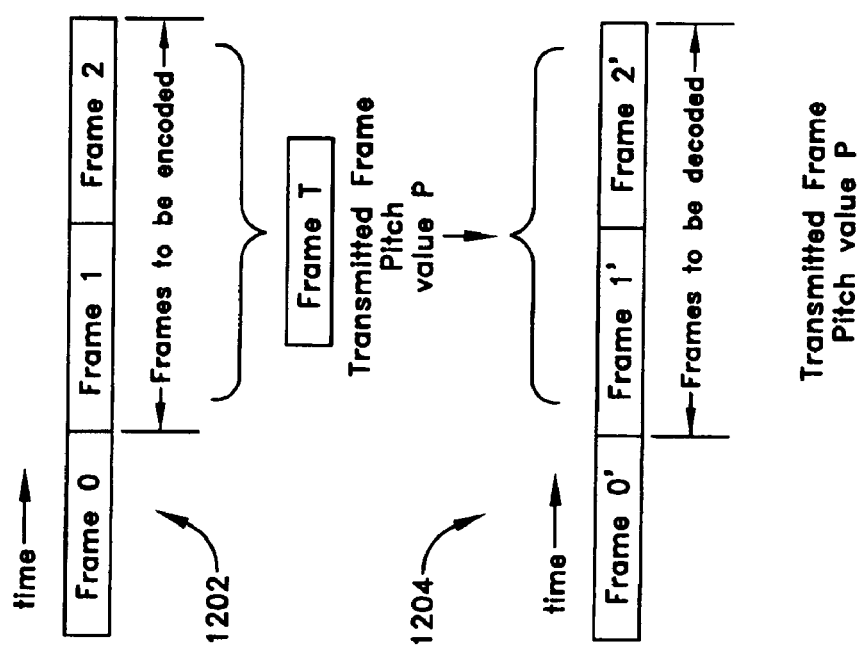
FIG. 12A depicts a block diagram illustrating a multi-frame encoding and decoding process.

A method of multi-frame pitch encoding and decoding will now be described as illustrated by FIG. 12A. During encoding, every two frames of pitch data are combined into a single frame which is transmitted. When the transmitted frame is received by the decoder, the single received frame is converted back to two frames of pitch data.

The method described below converts two frames of TDVC pitch information (a total of 12 pitch bits) into a single transmitted frame containing a pitch value P consisting of one mode bit and six pitch bits. Thus, the method reduces the number of pitch bits from 12 to 7 (per every two TDVC frames encoded).

At 1202, three frames of data, Frames 0, 1, and 2, are shown prior to encoding. Each frame contains a quantized pitch value which was previously generated by an optimal quantizer. During the encoding process, the pitch information from Frame 1 and Frame 2 is combined into a single pitch value P which will be included in the transmitted frame T. In order to determine a value for P, knowledge of the pitch value from the Frame 0, the frame received immediately prior to Frame 1, is required.

At 1204, three frames of decoded data are shown: Frames 0', 1', and 2'. During the decoding process, Frame T is converted to two frames: Frame 1' and 2' according to the methods described below.

With regards to the encoding process, the pitch information from Frame 1 and the pitch information from Frame 2 are converted to a single pitch value P according to two methods: a Mode 0 method, and a Mode 1 method. A distortion value D is then calculated for both the Mode 0 P value, and the Mode 1 P value, as described further below. The transmitted value of P which is encoded into the transmitted frame T is determined by which mode produces the lowest a lowest distortion value D. If Mode 0 produces a lower distortion value D then a Mode 0-encoded frame is transmitted. If Mode 1 produces a lower distortion value D, then a Mode 1-encoded frame is transmitted.

With regards to the decoding process, when the transmitted frame T is received by the decoder, the decoder reads the mode bit of the frame to determine whether the received frame T is a Mode 0-encoded frame or a Mode 1-encoded frame. If frame T is a Mode 0-encoded frame, a Mode 0 decoding method is used. If frame T is a Mode 1 encoded frame, a Mode 1 decoding method is used. The frame T is thereby decoded into two Frames: Frame 1' and Frame 2'.

The 2 encoding modes and 2 decoding modes are as follows:

Mode 0 encoding: P is set equal to the Frame 1 six-bit pitch value.

Mode 1 encoding: P is set equal to the Frame 2 six-bit pitch value.

Mode 0 decoding: P is used as the six-bit pitch value for both Frame 1' and Frame 2'.

Mode 1 decoding: The pitch value from Frame 0' is repeated for Frame 1', and P is used for Frame 2'.

For Mode 0, the distortion value ($D_0$) is calculated by:

$$D_0 = |F1-P| + |F2-P|$$

where F1 is the 6-bit quantized pitch value for frame 1, F2 is the 6-bit quantized pitch value for frame 2, and P is the pitch value that is transmitted.

For Mode 0, since P has been set to the value of F1, the distortion equation reduces to:

$$D_0 = |F2-F1|$$

For Mode 1, the distortion is:

$$D_1 = |F1-F0'|$$

since P is set to the value of F2. To select the transmission mode, choose Mode 0 if $D_0$ is less than $D_1$; choose Mode 1 otherwise.

Note that if Mode 0 simply chose P to be equal to the F2 six-bit pitch value (or, alternatively, to the average of the F1 and F2 six-bit pitch values) the same equation for $D_0$, above, would result. Because P is quantized with the same table as F1 or F2, it is computationally more efficient to use the individual values of F1 or F2 instead of the average.

b. Gain Encoding

The gain encoding algorithm assumes that an optimal, non-uniform scalar quantizer has already been developed for encoding a single frame of gain. For the purposes of illustration, assume a 5-bit quantizer is in use. The value of the First frame's gain (Frame 1) is encoded using this 5-bit quantizer. For the second frame (Frame 2), a 4-bit custom quantizer table is generated. The first 9 output levels for the table consist of fixed sparse samples of the 5-bit table (e.g. every $3^{rd}$ entry in the table). The next seven output levels are delta-referenced from the Frame 1 value. Delta referencing refers to quantizing the Frame 2 value as an offset in the quantization table from the Frame 1 value. The seven delta values supported are 0, +1, +2, +3, −1, −2, and −3. FIG. 12B shows an example of how the quantizer tables for the 5- and 4-bit algorithms may be constructed.

To select the quantization index for the Frame 2 gain, all entries in the Frame 2 table are compared to the gain, and the index corresponding to the lowest distortion is transmitted. For example, if the Frame 1 gain was quantized to level L18, and the Frame 2 gain is closest in value to L19, them the D+1 quantization level would be selected for Frame 2. As a second example, suppose the Frame 1 gain was at level L28, but the Frame 2 gain was closest in value to L4. In this case the L3 quantization level would be selected Frame 2.

c. Spectrum Encoding

The spectrum is encoded two frames at a time using an interpolative algorithm such as the one described in U.S. Pat. No. 6,078,880 "Speech Coding System and Method Including Voicing Cut Off Frequency Analyzer", which is incorporated herein by reference. The description of the algorithm begins in column 10, line 32. For this application, a 25 bit MSVQ algorithm is for the non-interpolated frames. A 3 bit interpolation flag is used for the interpolated frames. If a parametric vocoder does not use LSFs for spectral quantization, the spectral parameters can be converted to the LSF format before interpolation.

d. Voicing Encoding

Voicing is encoded by requantizing the TDVC fsel voicing parameter from a 3 bit value (0 to 7) to a 2 bit value with the following mapping:

| input fsel value | transmitted index | output fsel value |
| --- | --- | --- |
| 0 | 0 | 0 |
| 1 | 1 | 2 |
| 2 | 1 | 2 |
| 3 | 1 | 2 |
| 4 | 2 | 5 |
| 5 | 2 | 5 |
| 6 | 2 | 5 |
| 7 | 3 | 7 |

If the parametric vocoder does not use the TDVC-style voicing parameter (fsel), then the voicing parameter must be converted to TDVC format first.

12. Adaptive Correlation-Domain Zero Overhead Formant Enhancement

The perceptual quality produced by low rate speech coding algorithms can often be enhanced by attenuating the output speech signal in areas of low spectral amplitude. This operation is commonly known as formant enhancement. Typically, the formant enhancement function is performed in the speech decoder. However, it would be desirable to perform this formant enhancement function using an existing standardized algorithm that has no built in capability in the decoder.

The formant method described below can dramatically improve the subjective quality of speech when using an existing standardized speech coding algorithm with no changes in existing equipment. The following method can be applied in a speech decoder, a speech encoder or a transcoder like the ones described in Sections 1 through 7, above. The use of this formant enhancement method requires no extra overhead for transmission.

a. The process begins with a set of predictor coefficients a(i) that represent the all-pole model of the speech spectrum. If the process is being applied to the specific case of transcoding to LPC-10 (step 408 of section 3 or step 710 of section 6, above), then the non-deemphasized predictor coefficients a(i) are used. A second set of bandwidth-expanded coefficients is generated according to:

$$a2(i) = \gamma^i a(i)$$

where $\gamma$ is the bandwidth expansion factor (approximately 0.4).

b. The non-expanded a(i) coefficients and the expanded a2(i) coefficients are converted to their corresponding normalized autocorrelation coefficients R(k) and R2(k). In order to avoid truncation effects in subsequent steps, the autocorrelation conversion recursion is carried out to 50 lags.

c. Next, the two sets of autocorrelation coefficients R(k) and R2(k) are convolved to produce a set of 10 modified coefficients R'(k):

$$R'(k) = \sum_i R(i+k) * R2(i)$$

d. The modified autocorrelation coefficients are then converted to 10 reflection coefficients RC(i).

e. The reflection coefficients are examined to ensure that none have a value lying outside the range (−1.0, +1.0). If any values lie outside this range, the minimum order stable model is used (e.g. all RC( )s up to the first out-of-range coefficient are retained; the out-of-range coefficient and all others following are set to zero).

f. The resulting RC( ) set is converted back to prediction coefficients A( ) for quantization and transmission.

A significant benefit of this formant enhancement method is that it produces a $10^{th}$ order filter that has formant enhancement characteristics similar to the underlying $20^{th}$ order filter (that would have been obtained by simply convolving the two sets of predictor coefficients). Because there is no change in filter order, there is no additional overhead involved in transmission.

13. Adaptive Frequency-Domain Zero Overhead Formant Enhancement Method

An adaptive frequency-domain formant enhancement method is described below. As with the correlation-domain method described above in Section 12, the following method can dramatically improve the subjective quality of speech when using an existing standardized speech coding algorithm with no changes in existing equipment. The method can also be applied in a speech decoder, a speech encoder or transcoder, and requires no extra overhead for transmission.

a. The process begins with a set of predictor coefficients a(i) that represent the all-pole model of the speech spectrum. An amplitude spectrum H(ω) is extracted from the coefficients using:

$$H(\omega) = \left| \frac{1}{\sum_{i=0}^{m} a(i) e^{ij\omega}} \right|$$

where H(ω) is the spectral amplitude at digital frequency ω(=2πf/8000 for a system with 8 kHz sampling rate), a(i) are the predictor coefficients, m is the filter order and j is $\sqrt{-1}$□□□Amplitude values H(w) are computed every 50 Hz from 0-4000 Hz and stored in an array ampsav(k)=H(2πk50/8000), k=0 . . . 39.

b. The set of amplitude values computed in step a are used to calculate a set of enhancement values amp(k) according to the method described in U.S. Pat. No. 6,098,036, "Speech Coding System and Method Including Spectral Formant Enhancer", column 18 with $\omega_0$=2π50/8000 and $f_0$=50.

c. Set amp(k)=amp(k)*ampsav(k)

d. Compute a set of enhanced autocorrelation coefficients from the enhanced amplitude set amp(k) using:

$$R(i) = \sum_{k=0}^{39} amp^2(k) \cos(ik\omega_0)$$

e. The enhanced autocorrelation coefficients are then converted to 10 reflection coefficients rc(i).

f. The reflection coefficients are examined to ensure that none have a value lying outside the range (−1.0, +1.0). If any values lie outside this range, the minimum order stable model is used (e.g. all rcos up to the first out-of-range coefficient are retained; the out-of-range coefficient and all others following are st to zero).

g. The resulting rc( ) set is converted back to prediction coefficients for quantization and transmission.

h. A significant benefit of this algorithm is that it produces a $10^{th}$ order filter that has similar formant enhancement characteristics to those produced using the method of U.S. Pat. No. 6,098,036. Because there is no requirement to separately transmit the amplitude values, there is no additional overhead involved.

CONCLUSION

As described above, the present invention includes a transcoder which converts parametric encoded data in the compressed domain. Six individual specific transcoder structures and two formant enhancement methods are described in detail. A Voice Activity Detector which operates in the compressed domain is also disclosed. A Dual Talker synthesizer which uses a method of low-rate encoding is also disclosed. Lastly, a Compressed Domain Conference Bridge is disclosed which utilizes the compressed domain transcoder, the compressed domain voice activity detector, and the dual talker synthesizer.

It should be noted that while the inventions are described with respect to speech coding applications, the inventions and the techniques described above are not limited to speech coding. More generally, the inventions can be applied to any other type of compressed data transmission. For example, the transcoders described in sections 1-7 could be used to convert any compressed data stream from a first compressed format to a second compressed format in the compressed domain. Additionally, the conference bridge, the voice activity detector, the dual talker, and the formant enhancement methods could all be applied to other types of compressed data transmission other than compressed speech.

Although the systems and methods of the present invention has been described in connection with preferred embodiments, it is not intended to be limited to the specific form herein. On the contrary, it is intended to cover such alternatives, and equivalents, as can be reasonably included within the spirit and scope of the invention as defined by the appended claims.

The invention claimed is:

1. A method for enhancing speech prediction coefficient signals, comprising:
   a) receiving a set of prediction coefficient signals:
   b) calculating a set of amplitude spectrum coefficient signals based on said prediction coefficient signals;
   c) calculating a set of enhancement coefficient signals based on said amplitude spectrum coefficient signals;
   d) calculating a set of enhanced autocorrelation coefficient signals based on said enhancement coefficient signals;
   e) converting at least some of said enhanced autocorrelation coefficient signals into reflection coefficient signals;
   f) testing the range of values of said reflection coefficient signals; and
   g) converting at least some of said tested reflection coefficient signals into prediction coefficient signals.

2. The method according to claim 1, wherein step b) comprises calculating said amplitude spectrum coefficient signals at predetermined intervals within a predetermined frequency range.

3. A device for enhancing speech prediction coefficient signals, comprising:
   a) means for receiving a set of prediction coefficient signals;
   b) means for calculating a set of amplitude spectrum coefficient signals based on said prediction coefficient signals;
   c) means for calculating a set of enhancement coefficient signals based on said amplitude spectrum coefficient signals;
   d) means for calculating a set of enhanced autocorrelation coefficient signals based on said enhancement coefficient signals;
   e) means for converting at least some of said autocorrelation coefficient signals into reflection coefficient signals;
   f) means for testing the range of values of said reflection coefficient signals; and
   g) means for converting at least some of said reflection coefficient signals into enhanced prediction coefficient signals.

4. A method for enhancing coded speech signals, comprising:
   a) receiving a set of prediction coefficient signals;
   b) calculating a set of amplitude spectrum coefficient signals based on said prediction coefficient signals;
   c) calculating a set of enhancement coefficient signals based on said amplitude spectrum coefficient signals;
   d) calculating a set a of enhanced autocorrelation coefficient signals based on said enhancement coefficient signals;
   e) converting at least some of said enhanced autocorrelation coefficient signals into reflection coefficient signals;
   f) testing the range of values of said reflection coefficient signals;
   g) converting at least some of said reflection coefficient signals into prediction coefficient signals;
   h) receiving coded speech signals; and
   i) processing said coded speech signals based on said enhanced prediction coefficient signals.

5. A device for enhancing coded speech signals, comprising:
   a) means for receiving a set of prediction coefficient signals;
   b) means for calculating a set of amplitude spectrum coefficient signals based on said prediction coefficient signals;
   c) means for calculating a set of enhancement coefficient signals based on said amplitude spectrum coefficient signals;
   d) means for calculating a set of enhanced autocorrelation coefficient signals based on said enhancement coefficient signals;
   e) means for converting at least some of said autocorrelation coefficient signals into reflection coefficient signals;
   f) means for testing the range of values of said reflection coefficient signals;
   g) means for converting at least some of said reflection coefficient signals into enhanced prediction coefficient signals;
   h) means for receiving coded speech signals; and
   i) means for processing said received coded speech signals based on said enhanced prediction coefficient signals.

6. The device according to claim 5, wherein step b) comprises a means for calculating said amplitude spectrum coefficient signals at predetermined intervals within a predetermined frequency range.

* * * * *